US009569473B1

(12) United States Patent
Holenstein et al.

(10) Patent No.: US 9,569,473 B1
(45) Date of Patent: *Feb. 14, 2017

(54) METHOD OF CONTROLLING WHETHER AN UNCOMPLETED TRANSACTION APPLIED AGAINST A DATABASE GOES FORWARD USING EITHER SYNCHRONOUS OR ASYNCHRONOUS REPLICATION, OR USING EITHER ENCRYPTED REPLICATION OR UNENCRYPTED REPLICATION

(71) Applicant: Gravic, Inc., Malvern, PA (US)

(72) Inventors: Paul J. Holenstein, Downingtown, PA (US); John R. Hoffmann, Kennett Square, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,483

(22) Filed: Dec. 8, 2015

(51) Int. Cl.
*G06F 7/00* (2006.01)
*G06F 17/00* (2006.01)
*G06F 17/30* (2006.01)

(52) U.S. Cl.
CPC ... *G06F 17/30303* (2013.01); *G06F 17/30498* (2013.01); *G06F 17/30581* (2013.01)

(58) Field of Classification Search
CPC ............... G06F 17/30303; G06F 17/30498; G06F 17/30581; G06F 11/079; G06F 11/0751; G06F 11/0772
See application file for complete search history.

(56) References Cited

U.S. PATENT DOCUMENTS

| 7,162,435 | B1 | 1/2007 | Nagano |
| 2005/0110654 | A1* | 5/2005 | Kitano ................... G01C 21/26 340/13.24 |
| 2005/0187891 | A1 | 8/2005 | Johnson et al. |
| 2007/0254922 | A1* | 11/2007 | Hiraiwa ............... G06F 11/2058 514/338 |
| 2009/0132395 | A1 | 5/2009 | Lam et al. |
| 2010/0241676 | A1 | 9/2010 | Rathi |
| 2011/0178897 | A1* | 7/2011 | Balasubramanian .. G06Q 20/12 705/27.1 |

(Continued)

*Primary Examiner* — Azam Cheema
(74) *Attorney, Agent, or Firm* — Panitch Schwarze Belisario & Nadel LLP

(57) ABSTRACT

Transactions are applied against a database on a transaction processing system. A tracking engine identifies an uncompleted transaction to be joined, joins the uncompleted transaction, and collects one or more non-durable attributes of the joined uncompleted transaction. Collected attributes of the joined uncompleted transaction are compared against rules in a rules engine that are applicable to the transaction to determine whether an applicable rule in the rules engine is met. The joined uncompleted transaction is allowed to go forward and be applied against the database of the transaction processing system using a synchronous replication engine when the applicable rule is met, and an asynchronous replication engine when the applicable rule is not met. Alternatively, the joined uncompleted transaction is allowed to go forward using a replication engine that replicates using encryption when the applicable rule is met, or replicates unencrypted when the applicable rule is not met.

14 Claims, 16 Drawing Sheets

Event/Tx Tracking in a Synchronous Data Replication Engine – Database Changes

(56) References Cited

U.S. PATENT DOCUMENTS

| | | |
|---|---|---|
| 2011/0252407 A1 | 10/2011 | Rochette et al. |
| 2012/0047076 A1 | 2/2012 | Burney |
| 2012/0136896 A1* | 5/2012 | Tseng ................... G06F 17/18 707/780 |
| 2013/0094519 A1* | 4/2013 | Mann ................ H04L 41/0631 370/475 |
| 2013/0144683 A1* | 6/2013 | Rappaport ............ G06Q 50/16 705/7.29 |

* cited by examiner

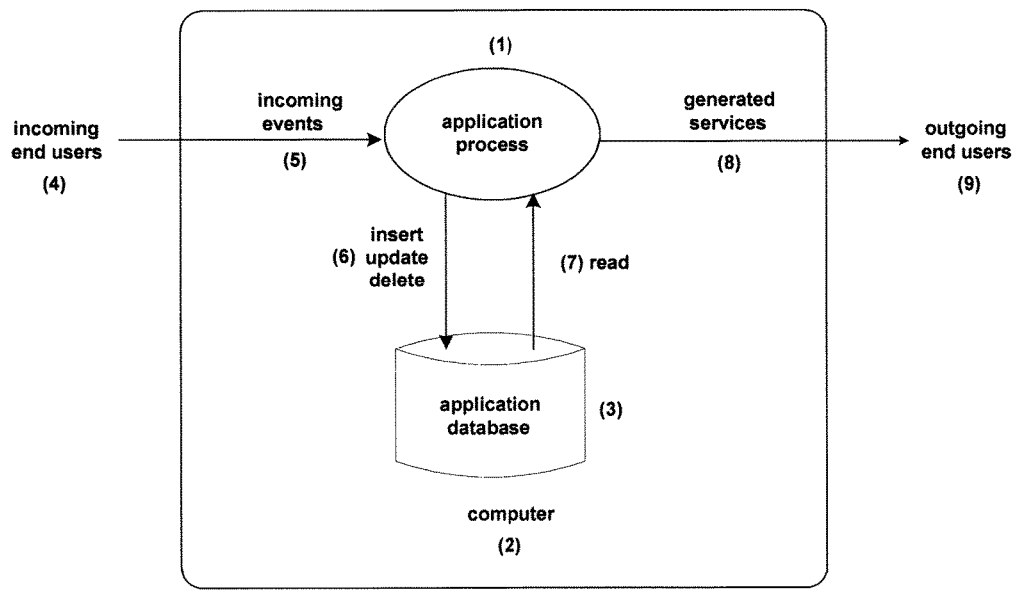
Figure 1: Prior Art - A Computer Application
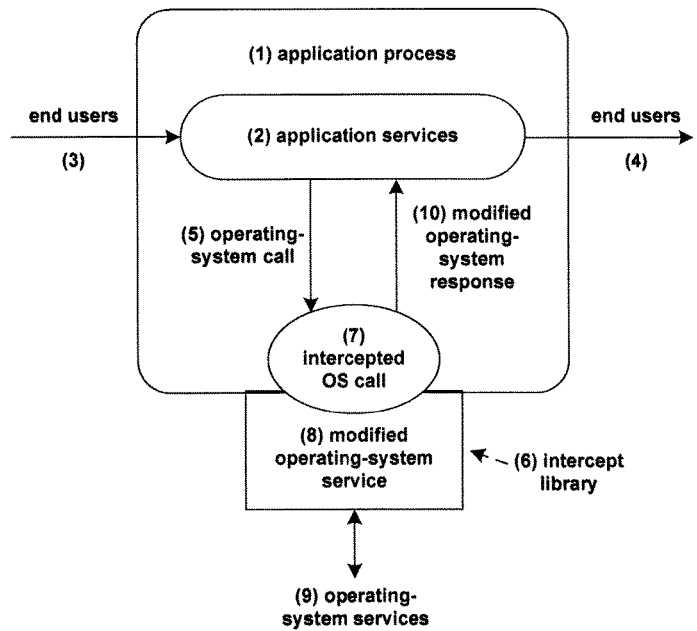
Figure 2: Prior Art - An Intercept Library

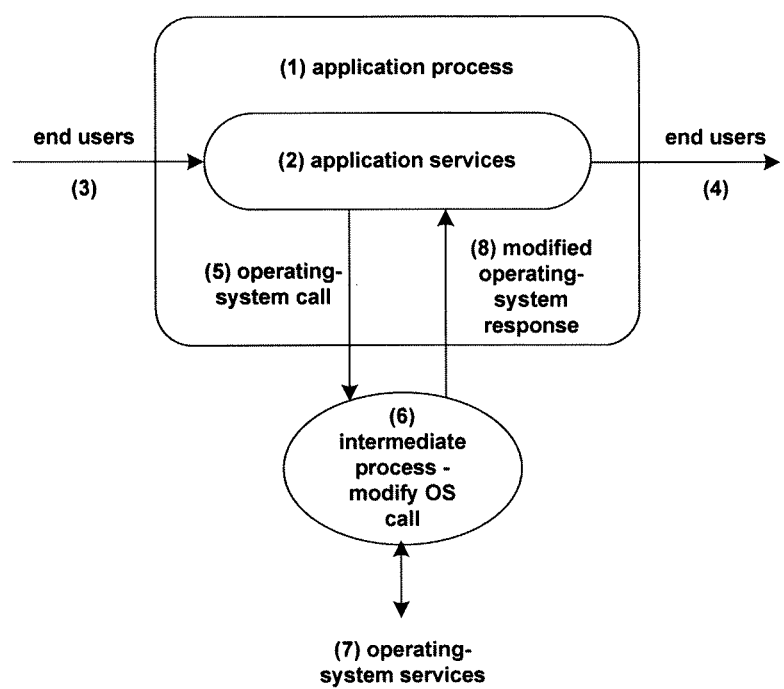
Figure 3: Prior Art - An Intermediate Process

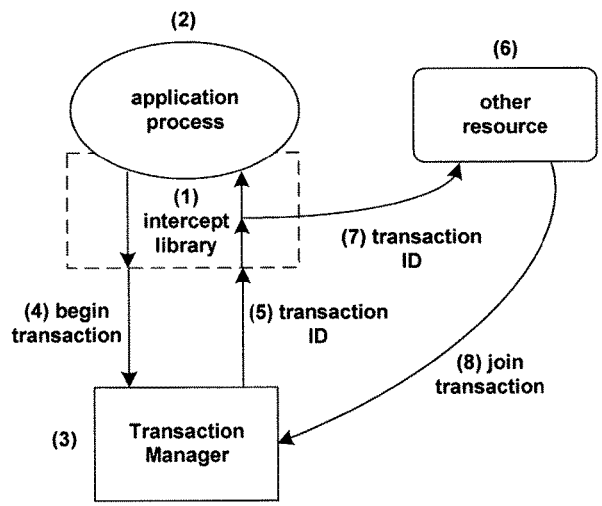
Figure 4: Prior Art - Explicitly Joining a Transaction with an Intercept Library
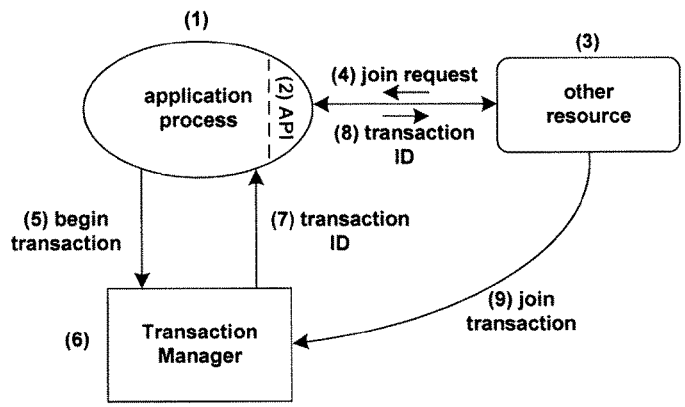
Figure 5: Prior Art - Explicitly Joining a Transaction with an Application API

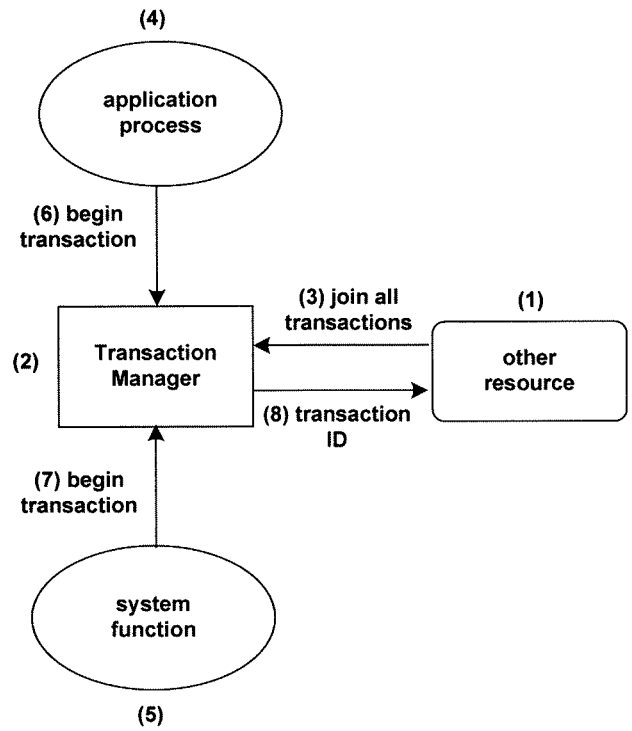
Figure 6: Prior Art - Implicitly Joining a Transaction
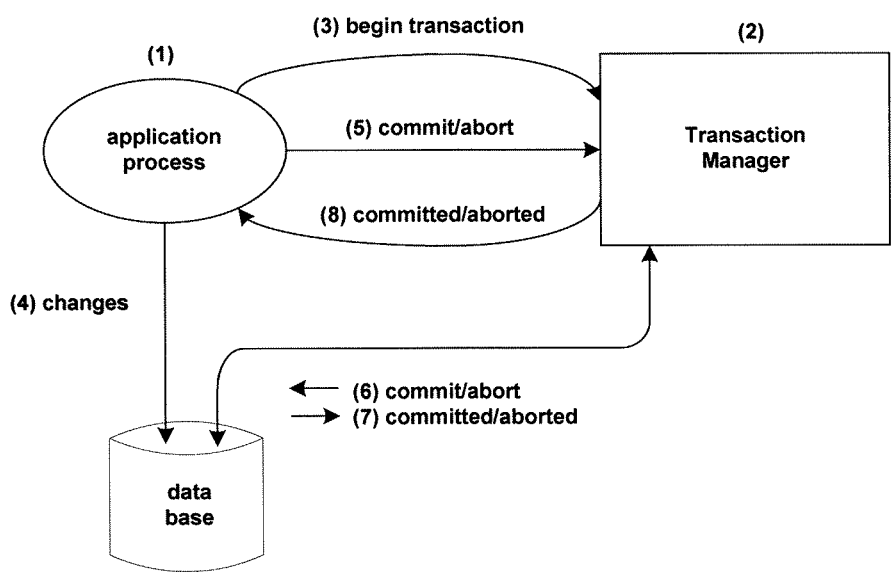
Figure 7: Prior Art: One-Phase Commit

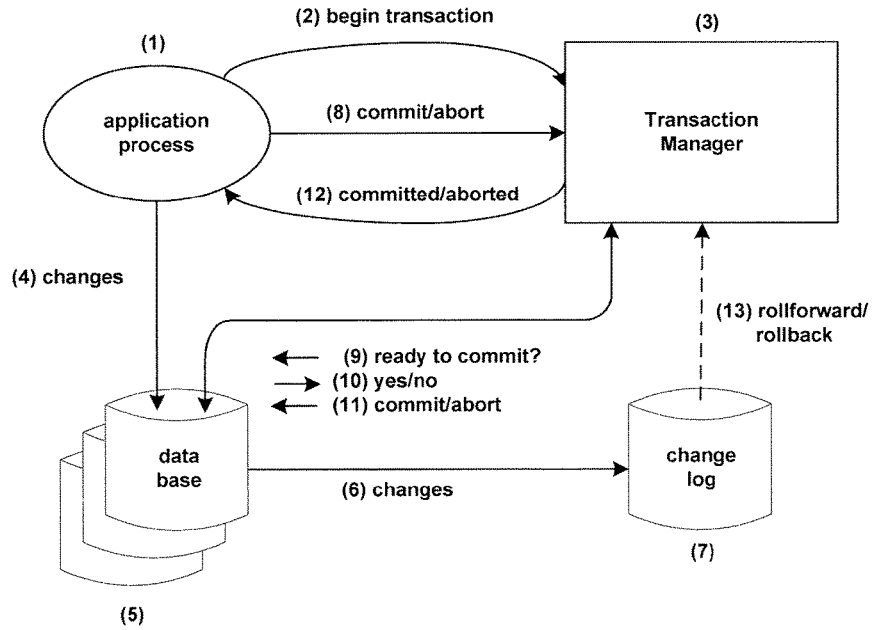
Figure 8: Prior Art - Transaction Manager and Two-Phase Commit Protocol
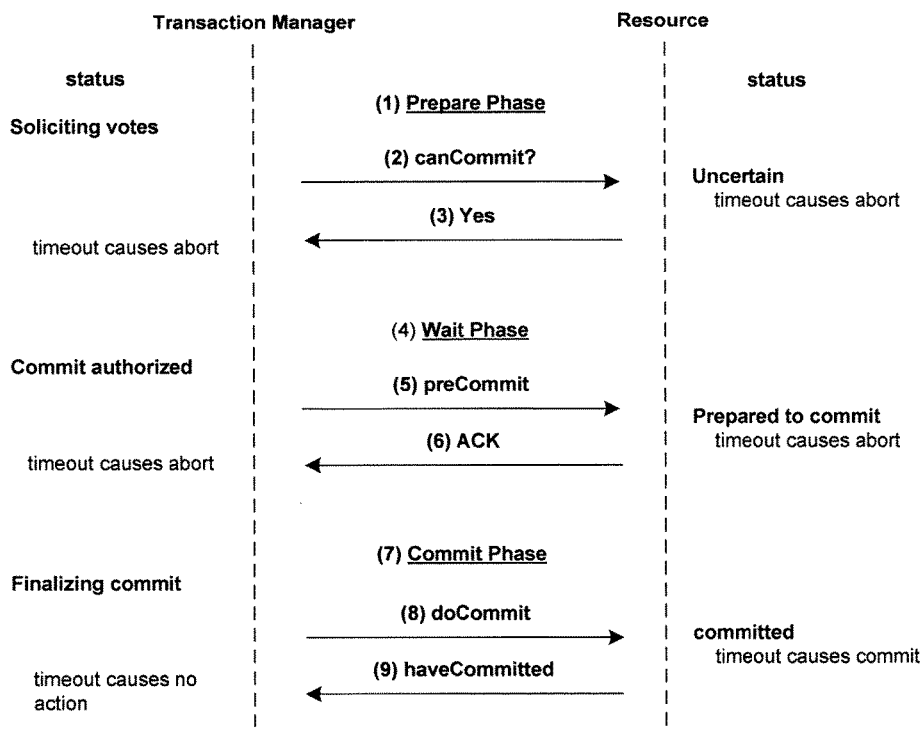
Figure 9: Prior Art - Three-Phase Commit Protocol

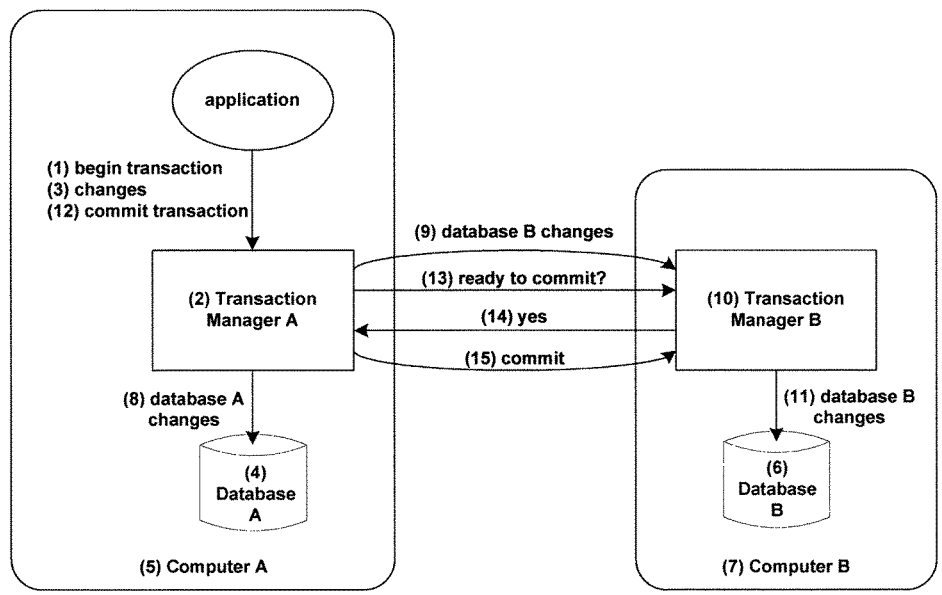
Figure 10: Prior Art - A Distributed Transaction
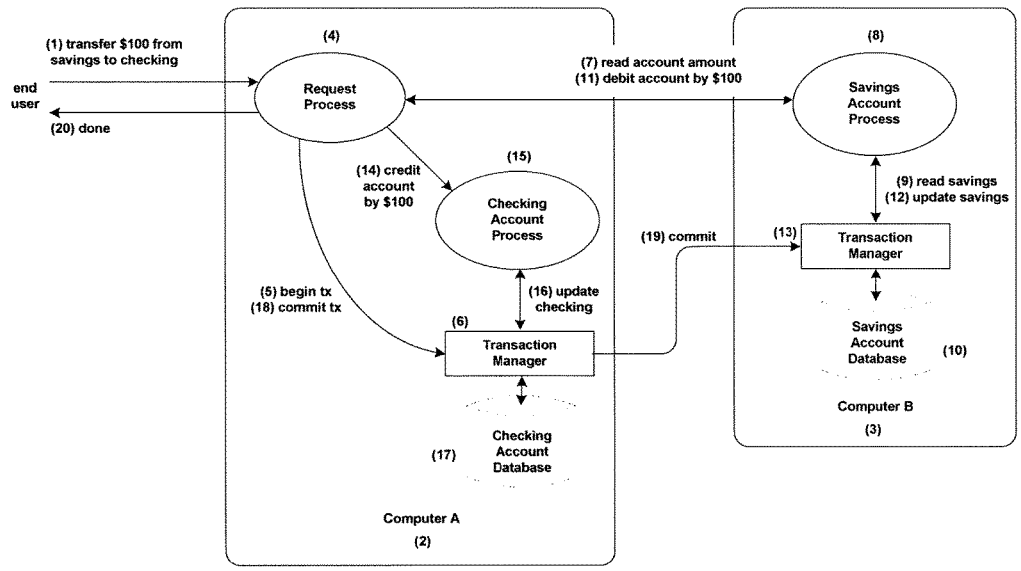
Figure 11: Prior Art - A Distributed Computer Application

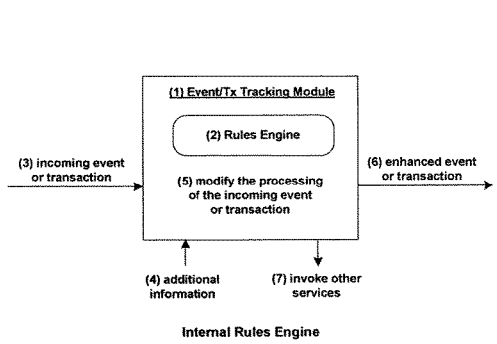
Figure 12A: Prior Art
An Event/Tx Tracking Module
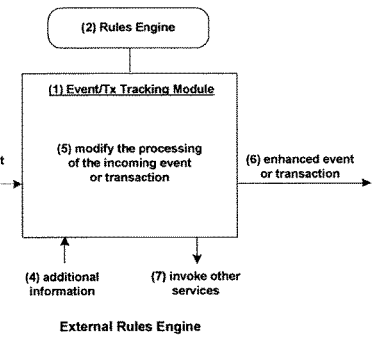
Figure 12B: Prior Art
An Event/Tx Tracking Module
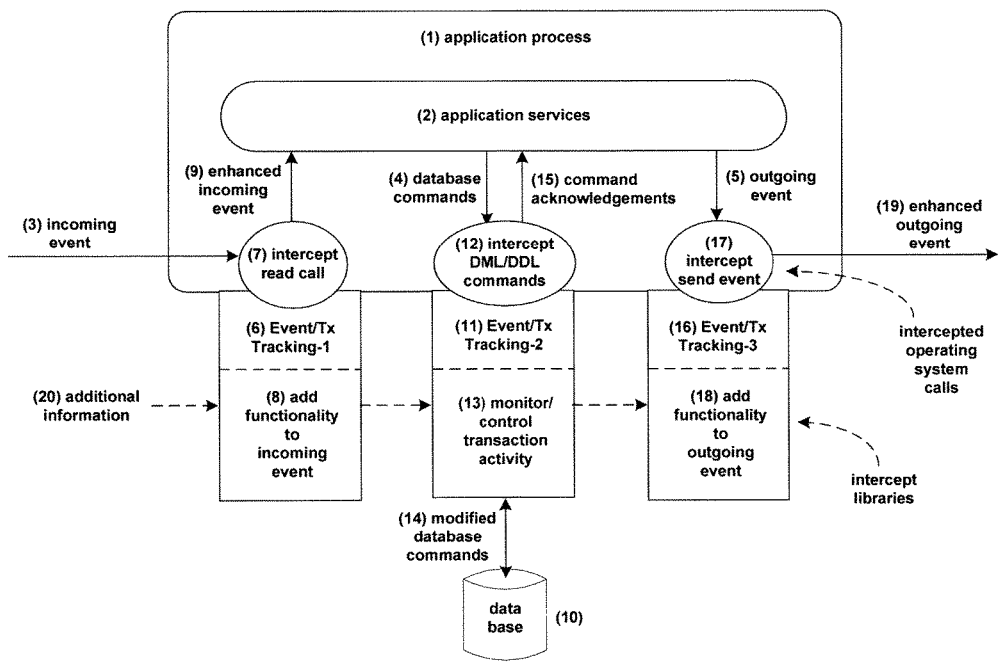
Figure 13: Prior Art - Implementing Event/Tx Tracking with Intercept Libraries

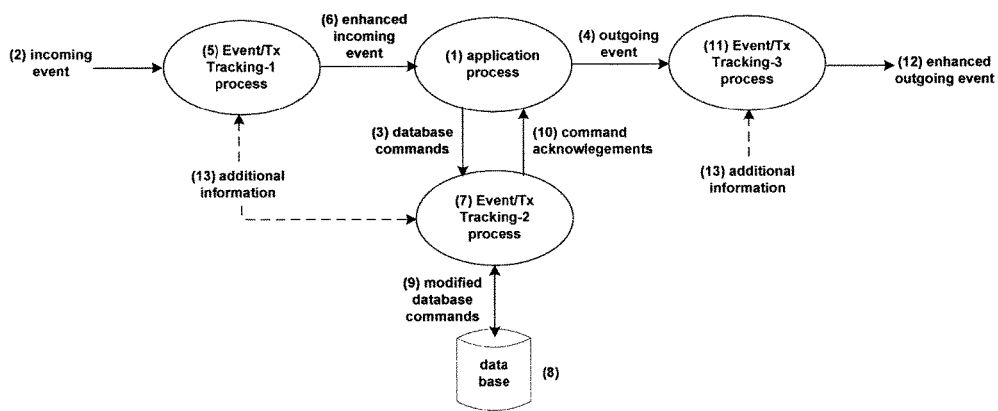
Figure 14: Prior Art - Implementing Event/Tx Tracking with Intermediate Processes
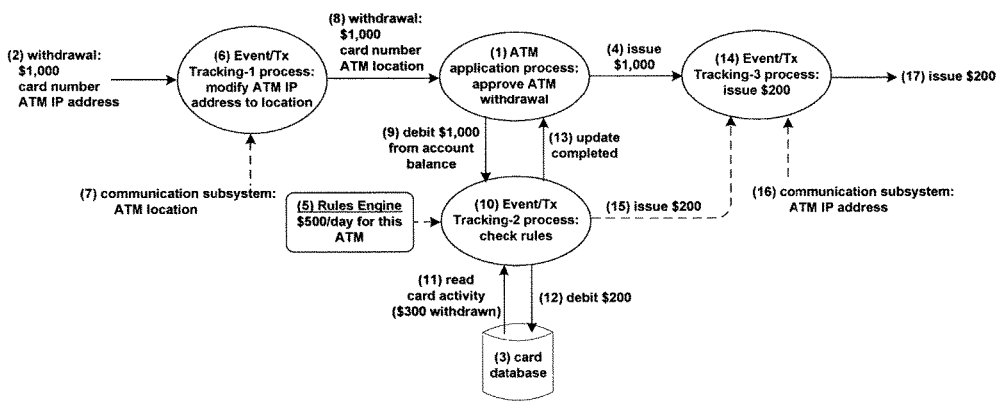
Figure 15: Prior Art - An Example of Event/Tx Tracking – Enhancing ATM Authorization Policies

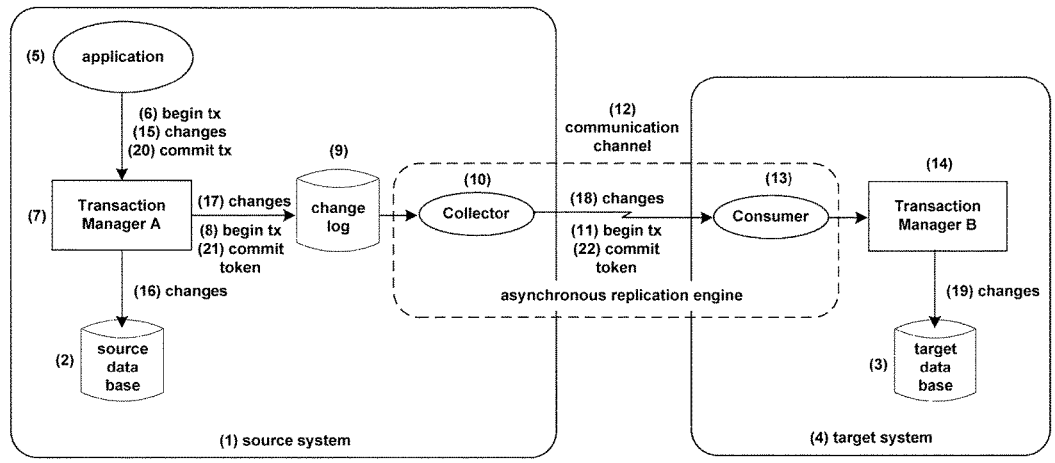
Figure 16: Prior Art - Asynchronous Replication
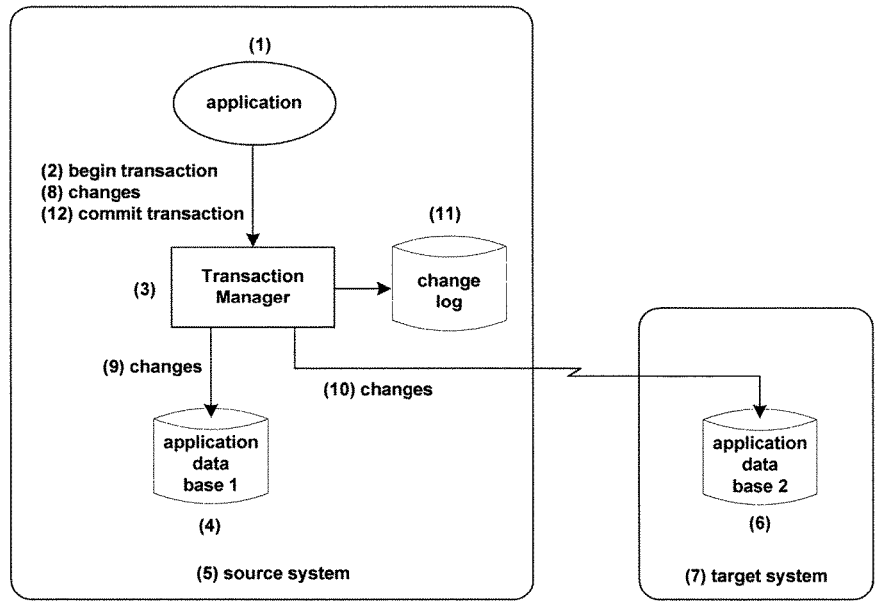
Figure 17: Prior Art: Synchronous Replication

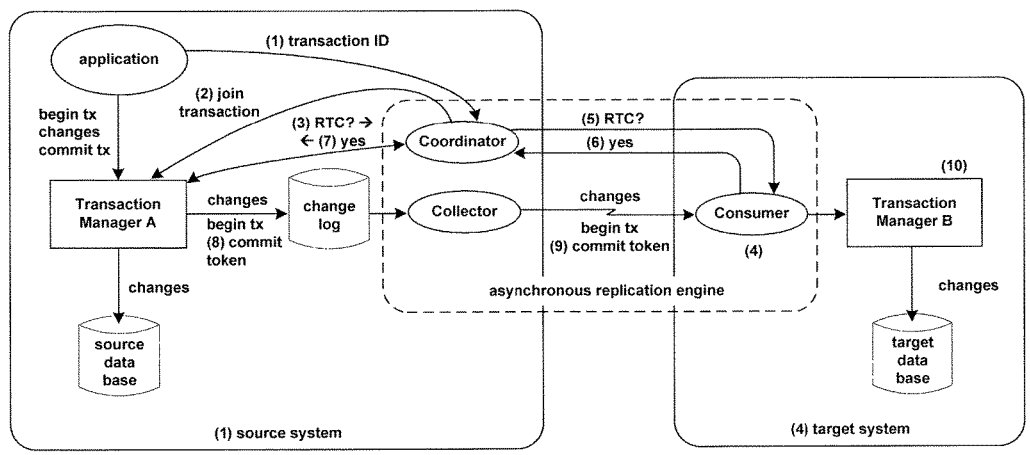
Figure 18: Prior Art - Coordinated Commits Replication

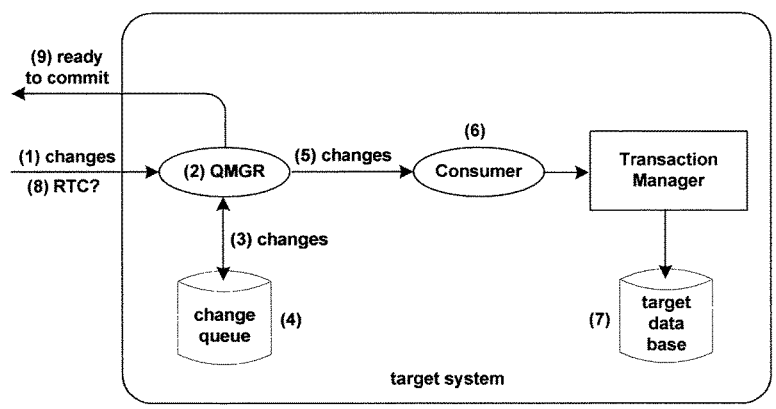
Figure 19: Prior-Art - Use of a Queue Manager with Coordinated Commits Wherein the Queue Manager is the Voting Participant
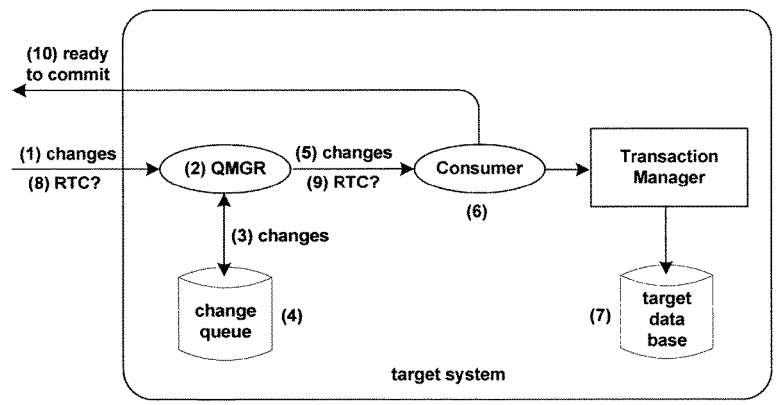
Figure 20: Prior-Art - Use of a Queue Manager with Coordinated Commits Wherein the Consumer is the Voting Participant

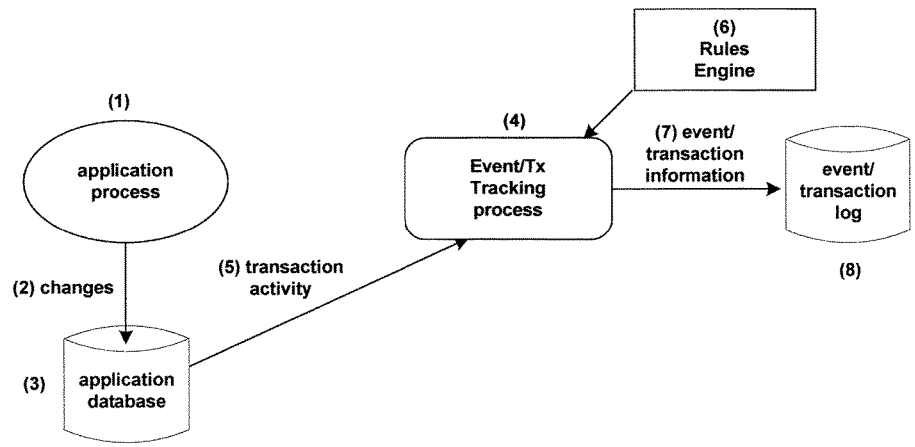
Figure 21: Implementing Transaction Logging - Processing a Joined Transaction
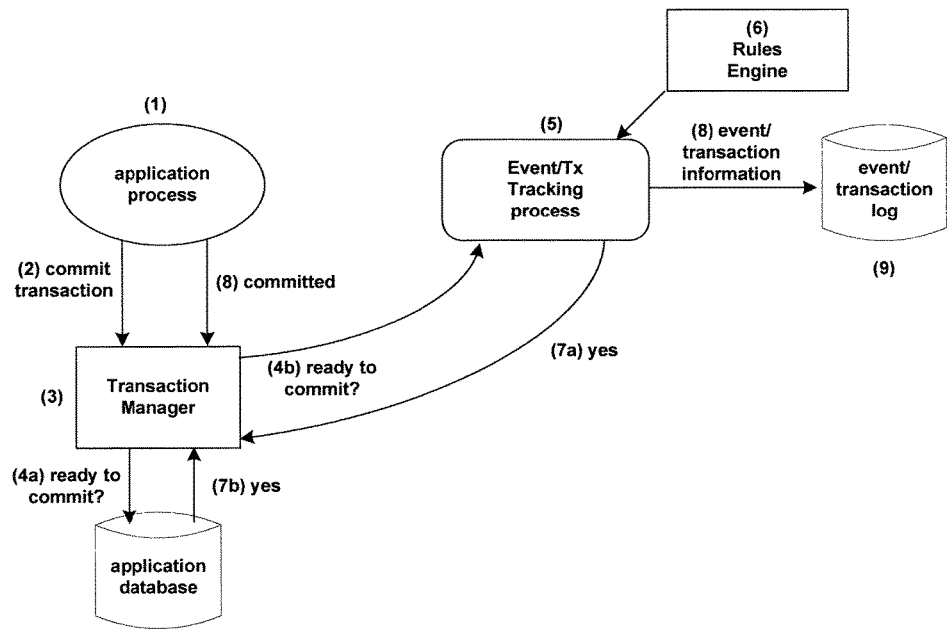
Figure 22: Implementing Transaction Logging - Committing a Joined Transaction

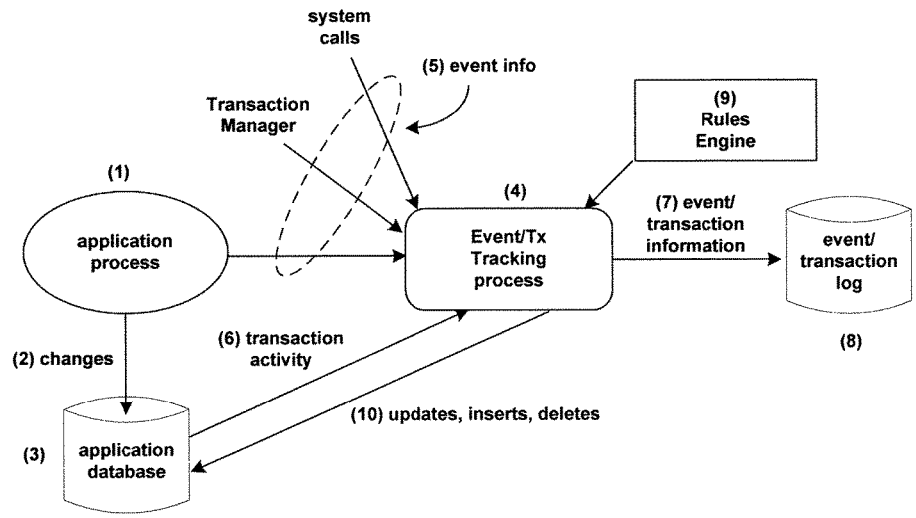
Figure 23: Implementing Transaction Control - Processing a Joined Transaction
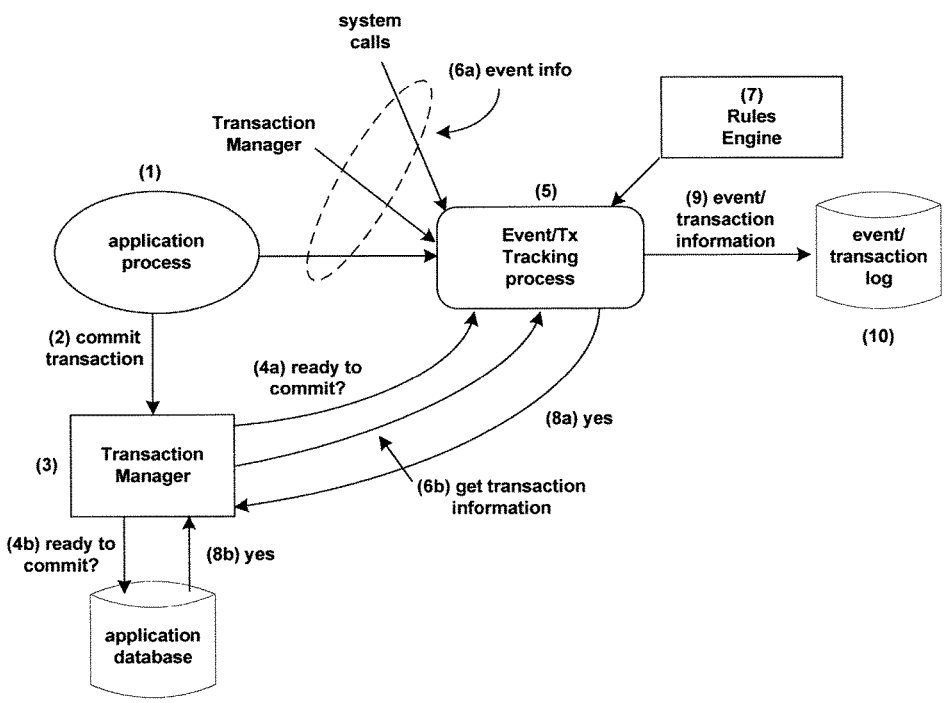
Figure 24: Implementing Transaction Control - Committing a Joined Transaction

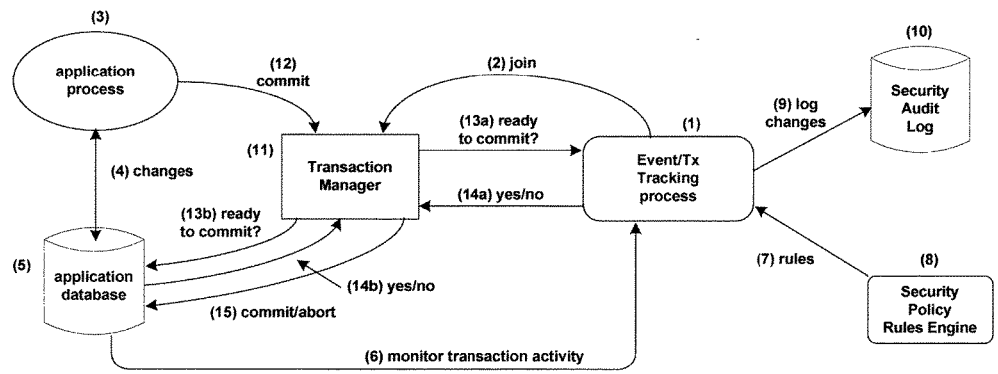
Figure 25: An Example of Event/Tx Tracking – Monitoring Transaction Security Policies
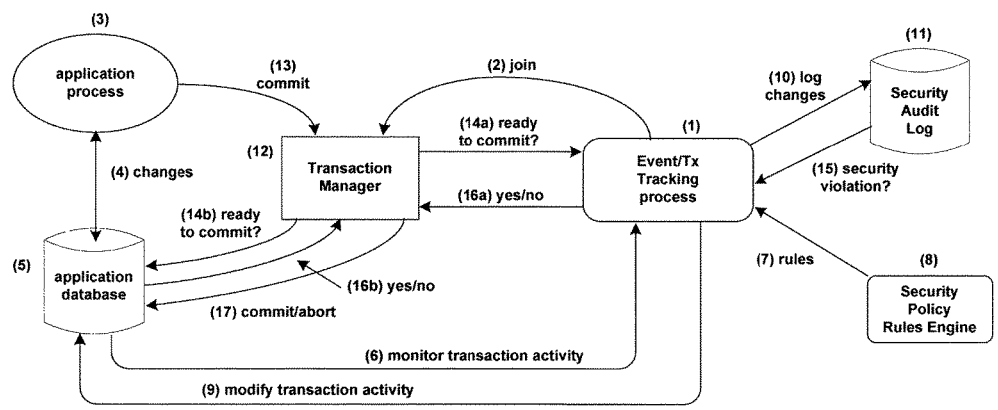
Figure 26: An Example of Event/Tx Tracking – Enforcing Transaction Security Policies

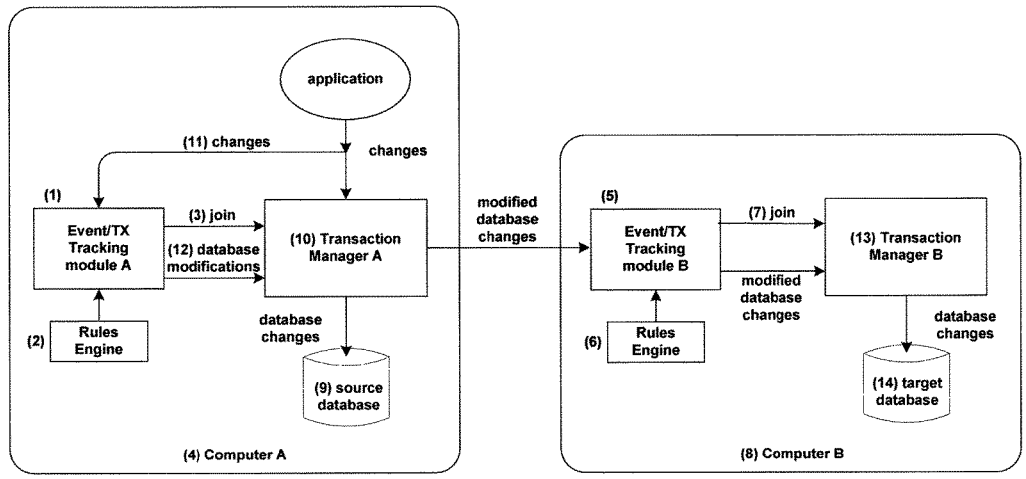
Figure 27: Event/Tx Tracking in a Synchronous Data Replication Engine – Database Changes
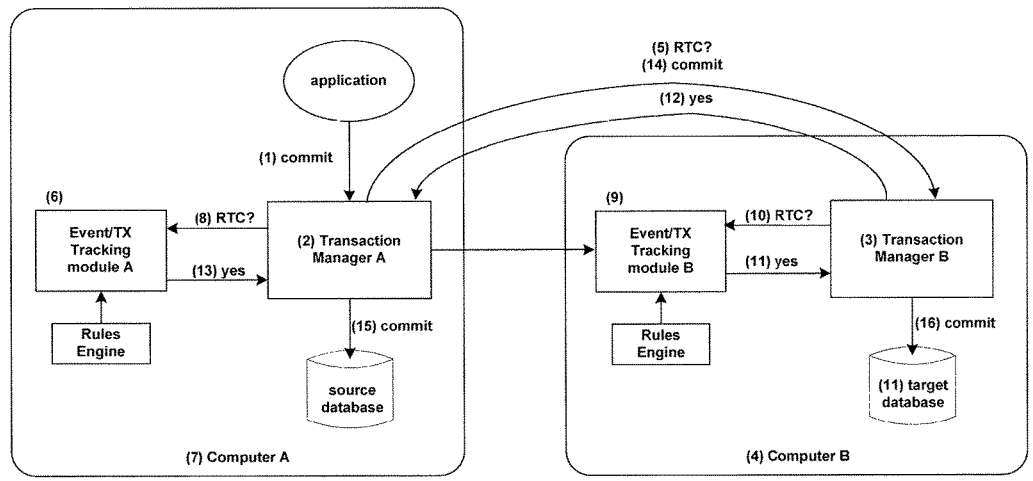
Figure 28: Event/Tx Tracking in a Synchronous Data Replication Engine – Commit

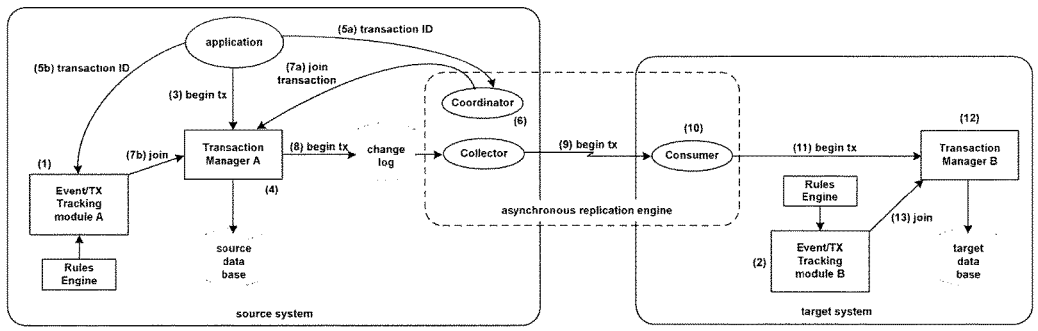
Figure 29: Event/Tx Tracking in a Coordinated Commits Replication Engine – Join
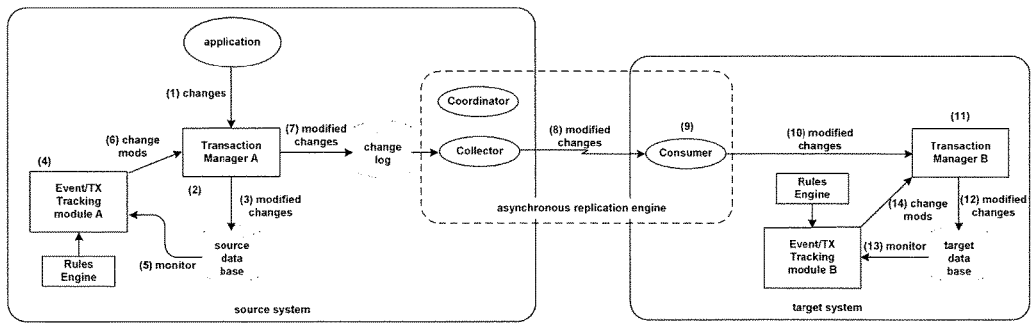
Figure 30: Event/Tx Tracking in a Coordinated Commits Replication Engine – Database Changes
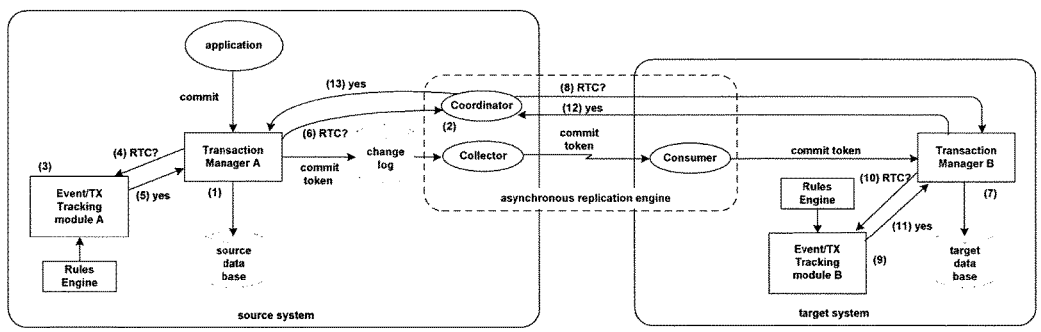
Figure 31: Event/Tx Tracking in a Coordinated Commits Replication Engine – Commit

METHOD OF CONTROLLING WHETHER AN UNCOMPLETED TRANSACTION APPLIED AGAINST A DATABASE GOES FORWARD USING EITHER SYNCHRONOUS OR ASYNCHRONOUS REPLICATION, OR USING EITHER ENCRYPTED REPLICATION OR UNENCRYPTED REPLICATION

CROSS-REFERENCE TO RELATED APPLICATIONS

This application is related to U.S. application Ser. No. 14/962,475 concurrently filed on Dec. 8, 2015 entitled "Systems and methods to log non-durable attributes of an uncompleted transaction so as to make such attributes durable," and is also related to U.S. application Ser. No. 14/962,480 concurrently filed on Dec. 8, 2015 entitled "Method of controlling whether an uncompleted transaction applied against a database goes forward or is aborted, and for modifying the uncompleted transaction so that it can go forward."

BACKGROUND OF THE INVENTION

Certain terms used in Section 1, "Background of the Invention," are defined in Section 3, "Definitions."

1.1 Computer Applications

Much of our daily life is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as a computer program (1) running in a computer (2). A computer program is basically a set of computer-encoded instructions and is often called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each describing a member of an entity set such as an employee. A table comprises rows that describe members of an entity set. A record comprises fields that describe attributes of the entity set, such as salary. A row comprises columns that describe attributes of the entity set. In this specification, "files" are equivalent to "tables," "records" are equivalent to "rows," and "fields" are equivalent to "columns."

1.3 Events

With further reference to FIG. 1, incoming end users (4) generate events (5) to be processed by the computer application. End users may be people, other computer applications, other computer systems, or electronic devices such as electric power meters. In this specification, the term "end user" means any entity that can influence an application and/or can request or use the services the application provides.

An example of an incoming event from an end user is a request for a bank-account balance. Another example is an alert that a circuit breaker in a power substation has just tripped. In some cases, there may be no incoming event. For instance, a computer application may on its own generate random events for testing other applications.

1.4 Event Processing

As shown in FIG. 1, the application receives an event from an incoming end user (5). As part of the processing of this event, the application may make certain modifications to its database (6).

The application can read the contents of rows in its database (7). As part of its processing, it may read certain information from the database to make decisions. Based on the event it received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report, either periodically or via an end-user request.

Alternatively, a service may be delivered spontaneously by the application program, such as on a timed basis or when certain conditions occur. For instance, an alarm may be generated to operations staff if the load being carried by a power transmission line exceeds a specified threshold.

The end users providing the input to the application may or may not be the same end users as those that receive its services.

1.6 Intercept Libraries (IL)

An intercept library (IL) is a prior art program that is accessible to or that can be incorporated into an application program (an executable). Incorporating a library into an executable does not require any changes to the executable. Thus, the application program can be enhanced by the functions provided by the intercept library with no requirement to make code changes.

An intercept library may be statically linked or dynamically linked. A statically linked intercept library is separately compiled and is bound into the application program. When the application program is run as a process, it includes the intercept library.

A dynamically linked intercept library (DLL) is separately compiled. It is linked to the application program when the application program is run as a process. Therefore, the DLL can be changed easily without having to rebuild the application. It also can be shared by other processes.

One function that an intercept library can perform is to intercept function calls that the application makes to the operating system. The intercept library can add functionality to those calls or can otherwise enhance them in some desirable way.

An illustrative example of an intercept library is depicted in FIG. 2. An application process (1) provides services (2) to its end users (3), (4). As part of its processing, the application process typically makes one or more calls to operating-system services (5). These calls, for instance, may be requests to read an incoming message, to generate an outgoing message, or to manipulate a database.

The intercept library (6) positions itself between the application process and the operating system in such a way as to intercept operating-system calls (7). Rather than the operating-system function being invoked on a call by the application, the intercept library is invoked instead. Thus, when the application makes an operating-system call (5) (for instance, to read an incoming message or to issue an update to a database), the intercept library, not the operating system, is invoked and processes the operating-system call (8). The intercept library can modify the execution of the operating-system function (9) in any way that it has been programmed. The response to the modified operating-system call then is returned to the application process (10).

For instance, an intercept library might intercept all interprocess messages being sent to other applications to add information to those messages for enhanced processing. Alternatively, it might intercept database calls (read, insert, update, delete) to make decisions about the validity of the changes, to modify the changes according to application rules, to record the change activity, or to log activity to a change log. For events or transactions, the intercept library might invoke other application services such as security monitoring, encryption, and authorization.

There is an inherent risk when intercept libraries are used to enhance the functions of applications. If the compile of a statically linked intercept library into a process is erroneously omitted, the functions intended for that library to provide will not be performed. Likewise, if the linking of a dynamically linked intercept library into a process is erroneously omitted, the functions that are intended for that library to provide will not be performed. Many applications comprise hundreds or even thousands of processes, and such errors easily arise. Specialized utilities are designed to detect the omission of intercept libraries. Of course, this in turn depends upon providing the utility with the correct and complete list of the use of intercept libraries, a process which in and of itself is error-prone.

Another challenge due to the use of intercept libraries is that they are inserted directly into the processing flow of the application. They therefore increase the path length of processing and consequently slow down execution. This issue is avoided by the use of joins, another method taught by this invention. See Section 2.1.1, "Joining an Audited Transaction."

It also is important for purposes of this invention to note that intercept libraries typically cannot insert themselves into the processing of audited transactions that are initiated by certain system facilities such as SQL database transactions. These transactions often are not visible to the application. The issue is addressed via the use of implicit joining, as described in Section 1.9.2, "Implicit Joining," and can be utilized to add functionality to such transactions.

1.7 Intermediate Processes (IP)

An intermediate process (IP) is a prior art program that performs functions similar to those performed by intercept libraries. However, instead of being implemented as a program or library that is bound into or linked to another program, it is a stand-alone process that is inserted between two other processes. There it can intercept the interprocess messages being exchanged between the two processes and can modify them in some useful way. Thus, the application program can be enhanced by the functions provided by the intermediate process with no requirement to make changes to the application program.

One function that an intermediate process can perform is to intercept function calls that the application makes to the operating system. The intermediate process can add functionality to those calls or can otherwise enhance them in some desirable way.

An illustrative example of the use of an intermediate process is shown in FIG. 3. An application process (1) provides services (2) to its end users (3), (4). As part of its processing, the application process typically makes one or more calls to operating-system services (5). These calls, for instance, may be requests to read an incoming message, to generate an outgoing message, or to manipulate a database.

An intermediate process (6) is positioned between the application process and the operating system in such a way as to intercept interprocess messages representing operating-system calls. Thus, rather than the application directly making the operating-system call, the call can be modified by the intermediate process; and a revised operating-system call can be made to the operating system (7). The intermediate process can modify the execution of the operating-system function in any way that it has been programmed. The response to the modified operating-system call is returned to the application process (8).

For instance, an intermediate process might intercept all interprocess messages being sent to other applications in order to add information to those messages. Alternatively, it might intercept database calls (read, insert, update, delete) to make decisions about the validity of the changes, to modify the changes according to application rules, to record the change activity, or to log activity to a change log. For events or transactions, the intercept library might invoke other application services such as security monitoring, encryption, and authorization.

There is an inherent risk in the use of intermediate processes to enhance the functions of applications. If the insertion of an intermediate process between two application processes is erroneously omitted, the functions that are intended for the intermediate process to provide will not be performed. Many applications comprise hundreds or even thousands of processes, and such errors easily arise.

Both intercept libraries and intermediate processes are prior art examples of adding or enhancing application processing without having to make code changes to the application. However, they both can be accidentally omitted from the system configuration; neither can intercept certain types of system transactions, and they both add to the processing path length of the application.

1.8 Transactions 1.8.1 Audited Transactions

In many applications, changes to the database (inserts, updates, deletes, or changes to the database structure, etc.) are organized as audited transactions. An audited transaction is a delimited set of changes that either must all be made to a database or sent to an application, or else none are. For instance, a transaction in a banking application may transfer funds from one account to another. It applies a debit to one account (a reduction in its value) and an equal credit to another account (an increase in its value). Either both of these updates must occur or neither must occur in order to keep the customer's accounts balanced.

Audited transactions typically exhibit the ACID properties Atomicity, Consistency, Isolation, and Durability, as described earlier. In some implementations, the ACID properties may be relaxed. For instance, the attributes of consistency and isolation may be traded for performance (see Section 1.11.4, "BASE Protocol").

The changes comprising an audited transaction are delimited by a pair of directives typically issued by the application process to a Transaction Manager. The beginning of a transaction is identified by a Begin Transaction directive (in some systems, the Begin Transaction directive is implied by the first change of a new transaction). The conclusion of an audited transaction is typically either a Commit Transaction directive or an Abort Transaction directive. A Commit Transaction directive causes all of the changes within the transaction to be applied to the database and to be durable. An Abort Transaction directive causes the changes within the transaction to be discarded.

The Commit or Abort directive can be issued explicitly by the application; or they may implicitly occur, for example at the end of an I/O operation. Though the terms Begin Transaction, Commit Transaction, and Abort Transaction are used in this specification, they are often known by different terms in different systems. However, the actions they denote are substantially the same in all systems.

A typical audited transaction appears as follows:
Begin Transaction
Insert Row A
Read Row B
Update Row B
Delete Row C
Commit Transaction The property of atomicity is guaranteed by ensuring that either all changes within the transaction are applied or that none are.

The property of consistency is typically guaranteed by locking all data objects that are to be changed so that their value is hidden from other applications until they have been committed or aborted as an entire transaction.

The property of isolation also is typically guaranteed by locking all data objects that are to be changed so that no other transaction can modify their values until the current transaction commits.

The property of durability typically is guaranteed by writing the changes to a persistent database such as disk so that they survive any ensuing system failures.

1.8.2 Unaudited Transactions

An unaudited transaction is a logical sequence of database changes performed to accomplish a business function, but the database changes are not bound by begin and end delimiters. If an application deals in unaudited transactions, it simply applies each change in the transaction to the database via a database manipulation event.

Unaudited transactions do not provide the ACID properties of audited transactions unless these capabilities are built into the application. For instance, the application may lock each update to provide consistency and isolation and then unlock the locked data objects when it has finished its transaction. It can make all changes to a disk-resident database to ensure durability. However, it must ensure that all changes have been flushed to disk before releasing its locks if it is to ensure not only durability but consistency and isolation as well. Special complex efforts are required in the application to provide these features across failures.

When a process is dealing with an unaudited transaction, it communicates directly with the database management system via events. Each event contains the specification of the database operation that is to take place, such as read, insert, update, or delete, and required attributes such as key values.

A typical unaudited transaction might be executed as follows via a series of database manipulation events:
Insert Row A with lock
Lock Row B
Read Row B
Update Row B
Delete Row C
Unlock Row A
Unlock Row B Failure at any point in this processing sequence may leave the database in an inconsistent state. For instance, if a system failure occurs immediately after the update to Row B, the delete of Row C will not occur; and Rows A and B will remain locked. There is no way for a Transaction Manager or any other facility to undo the Row A insert and the Row B update that occurred before the failure since there is no information as to the scope of the transaction, unless the application is modified to take many intervening check points of its processing path to a durable store. It is because of this extra processing and lack of support for the ACID properties that unaudited transactions are typically not used.

1.8.3 Converting Unaudited Transactions to Audited Transactions

Some systems provide utilities for converting unaudited transactions to audited transactions. These utilities use complex rules engines to look for sequences of events that possibly might be a complete business transaction. Alternatively, they may simply count the events or time the duration of event sequences and frame the transactions with begin and commit directives. For instance, the utility may frame a transaction with every five input/output functions, before every interprocess message, or when an I/O is performed at a requesting terminal device. The utility then bounds each sequence with a Begin Transaction directive and a Commit Transaction directive.

In the above example, the utility might note a sequence of commands that locks Rows A and B and then unlocks Rows A and B. This may be an indication that the operations included between the lock and unlock commands represent a single transaction.

Examples of such utilities are found for many systems. For HP NonStop systems, they include AutoTMF from Carr Scott Software, Inc., of Duxbury, Mass., USA, and TMF-Audit Toolkit from TANDsoft Consultants Incorporated of Beaconsfield, Quebec, Canada.

1.9 Joining a Transaction

One or more databases or other resources may be involved in an audited transaction as voting participants. An example of a participating resource that is not a database is a synchronous replication engine that must vote on the outcome of the transaction. In order to be a voting participant, the Transaction Manager must join the resource to the transaction. A resource may join a transaction either explicitly or implicitly.

1.9.1 Explicit Joining

FIG. 4 illustrates one method for allowing a resource to explicitly join a transaction using an intercept library. An intercept library (1) is bound into the application (2) and intercepts application calls to the Transaction Manager (3). When the application is given an event that must generate a transaction, the application requests that the Transaction Manager begin a transaction (4). The Transaction Manager will do so and will provide the transaction ID to the application (5). These signals pass through the intercept library as they progress between the application and the Transaction Manager.

The intercept library will return the transaction ID to the application and will inform the resource (6) that the application is beginning a transaction and will pass it the transaction ID (7). The resource will notify the Transaction Manager that it is joining the transaction (8). In this way, the resource becomes a voting member of the transaction, is able to monitor all activity initiated by the transaction, and is able to add its own activity.

An alternate method for allowing a resource to explicitly join a transaction is shown in FIG. 5. The application (1) provides an API (application programming interface) (2) that allows the resource (3) to call a joining function in the application. The resource uses this API to register with the application its interest in joining transactions that the application initiates (4).

When the application initiates a transaction, it sends a begin transaction directive (5) to the Transaction Manager (6). The Transaction Manager returns a transaction ID (7) to the application. Via the application's API, the application responds to the resource's request with the transaction ID (8). The resource then notifies the Transaction Manager that it is joining this transaction (9). In this way, the resource becomes a voting member of the transaction, is able to monitor all activity initiated by the transaction, and is able to add its own activity.

In either of these cases, it is not necessary for the resource to join the transaction at the beginning of the transaction. The intercept library, the application API, or the resource itself can monitor the progress of the transaction and can cause the resource to join the transaction only if certain criteria are met. The resource will then join the transaction at this intermediate point.

At any point in a transaction, the resource can decide that its involvement is unnecessary. It can then inform the Transaction Manager that it is a read-only participant—i.e., it was simply monitoring the transaction. This is, in effect, an abstention to voting; and the Transaction Manager records no vote for the resource.

Either of these two explicit joining methods allows the resource to join transactions initiated by the application. Furthermore, the resource can use information about the transaction to decide whether it wants to join at any given point and can ignore transactions in which it is not interested. It is a voting member of any transaction it joins and can vote to commit or abort the transaction.

There is an inherent risk when explicit joining is used to enhance the functions of applications. Joining a resource to multiple applications may be desirable; but if the explicit joining of a resource to an application is erroneously omitted, the functions that are intended for that resource to provide will not be performed. Many applications comprise hundreds or even thousands of processes, and these errors easily arise.

Explicit joining avoids the complication and overhead of being inserted directly into the processing flow and therefore increasing the processing path length and consequently the execution time. Functionality that is added by joining is processed in parallel with the application processing and does not increase the application's path length.

Explicit joins cannot be used to join transactions initiated by certain system facilities.

1.9.2 Implicit Joining

One limitation of explicit transaction joining is that some transactions generated by system utilities rather than by applications are not known to the application. Therefore, the resource cannot explicitly join these transactions. For instance, in some systems, the SQL database manager does not inform the application that it is beginning a transaction. Therefore, the application cannot inform the resource that a new transaction has been initiated so that the resource can explicitly join it.

This problem is solved by implicit transaction joining. The resource makes a request to the Transaction Manager that it be included as a voting participant in any transaction that is initiated. The request may be for a specific subset of transactions such as those being initiated by a particular CPU or by a particular user. The resource will then be joined to any such transaction, whether the transaction be initiated by an application, by a system-level function, or by any other means.

Implicit joining is shown in FIG. 6. The resource (1) requests that the Transaction Manager (2) include it as a participating partner in any transaction that is initiated, regardless of the initiating source (3). Thereafter, an application (4) or a system function (5) can request that the Transaction Manager begin a transaction on its behalf (6), (7). The Transaction Manager informs the resource of the transaction ID of the new transaction (8). The resource has now been joined to the new transaction as a voting participant.

One limitation of implicit joining is that the resource must join all transactions. With explicit transaction joining, the resource may elect not to join certain classes of transactions initiated by the application.

Implicit joining avoids the earlier mentioned risks associated with intercept libraries and explicit joins. With these methods, there is the possibility that a configuration error will result in the intended monitoring or modification functions not being executed. With implicit joining, that risk is eliminated since the joining is a system function provided by the Transaction Manager, not an application function.

Moreover, implicit joining avoids the complication of being inserted directly into the processing flow and therefore increasing the processing path length and consequently the execution time. Functionality that is added by joining is processed in parallel with the application processing and does not increase the application's path length.

1.10 Transaction Manager 1.10.1 Transaction Processing

If an application deals in audited transactions, the transactions are generally managed by a Transaction Manager, as shown in FIG. 8. When an application (1) wishes to start a transaction, it makes a request (2) to the Transaction Manager (3). The application then makes the changes (4) bounded by the transaction to its application databases (5). As each change is made, its before and after images are typically written (6) to a change log (7).

1.10.2 Transaction Commit

When the application has completed the database changes for the transaction, it sends a commit request (8) to the Transaction Manager. The Transaction Manager next asks each database and resource involved in the transaction if it is ready to commit (9). If all databases and resources respond positively (10), the Transaction Manager informs them to commit the transaction (11). It then informs the application that the transaction has been committed (12).

If any database or resource responds that it cannot make the changes to its database (10), the Transaction Manager informs all databases and resources to abort the transaction (11). No changes are made to the databases, all locks are released, and the application is informed that its transaction has been aborted (12). The application also can request that the Transaction Manager abort the transaction (8) rather than ask it to commit the transaction.

1.10.3 The Change Log

The Transaction Manager uses the change log (7) to correct corruption to the database. It uses the before images stored with each change to roll back data objects to their original values if they have been erroneously changed or aborted. It uses the after images in the change log to roll forward data objects whose changes were lost due to a system malfunction (13).

1.10.4 Unaudited Transactions

If the application uses unaudited transactions, each change in the transaction is applied directly to the database via a database manipulation event. This may be accomplished directly by the application or in conjunction with a Transaction Manager that deals in unaudited transactions. In many cases, either the application or the Transaction Manager records all changes for unaudited transactions in a change log.

1.11 Transaction Management Protocols

A Transaction Manager can implement several different protocols to process audited transactions. The protocols are designed to enforce to some extent or other either all or most of the ACID properties of audited transactions. Included in these protocols are One-Phase Commit, Two-Phase Commit, Three-Phase Commit, and BASE.

1.11.1 One-Phase Commit Protocol (1PC)

The One-Phase Commit protocol (1PC) is used if the transaction affects only a single database or resource. The 1PC protocol is shown in FIG. 7.

The application (1) informs the Transaction Manager (2) that it wishes to begin a transaction (3). The application then makes changes to its single database (4).

When it has finished processing the transaction, it requests the Transaction Manager to commit the transaction (5). The Transaction Manager will request the database to commit the transaction (6). If the database or resource is able to commit the transaction, it informs the Transaction Manager that it has committed the transaction (7), and the Transaction Manager will inform the application that its transaction has been committed (8). If the database or resource is unable to commit the transaction, it aborts it and so informs the Transaction Manager (7). The Transaction Manager will inform the application that its transaction has been aborted (8).

The application can also request the Transaction Manager to abort the transaction (5). The Transaction Manager will inform the database to abort the transaction (6), and the database will confirm the action (7). At this point, the Transaction Manager will inform the application that its transaction has been aborted (8).

1.11.2 Two-Phase Commit Protocol (2PC)

The Two-Phase Commit Protocol (2PC) is used when the transaction involves two or more databases and/or resources. FIG. 8, described above, depicts the 2PC protocol. With reference to FIG. 8, as the application applies a read or an update (4) to a data object in a database (5), that data object is locked. Until the transaction commits, no other transaction can modify the data object or can read its contents unless "dirty reads" are allowed (in which case the current value of the data object is returned, which may be before or after it has been modified) or unless "read committed" is used (the value of the data object before the lock is returned).

When the application requests that the transaction be committed (8), the Transaction Manager enters the Two-Phase Commit protocol. The 2PC protocol comprises two successive phases, the Prepare phase and the Commit/Abort phase. The Transaction Manager first enters the Prepare phase. It asks each of the resources that participated in the transaction if it is prepared to commit the transaction (9). In order for a resource to be ready to commit, it must have received all changes in the transaction and must have safe-stored them (either by temporarily storing them in persistent storage or by applying them to the database).

If all resources respond positively (10), the Transaction Manager enters the Commit phase. It informs all resources to commit the transaction (11). All resources will make the changes permanent. The Transaction Manager will inform the application that its transaction has completed (12).

If any resource responds negatively in the Prepare phase, the Transaction Manager will enter the Abort phase and will inform all resources to abort the transaction. All resources will ignore the changes, and the Transaction Manager will inform the application that its transaction has been aborted.

If instead of requesting a commit, the application requests that the Transaction Manager abort the transaction, the Transaction Manager will skip the Prepare phase. It will immediately enter the Abort phase and will inform all resources to abort the transaction.

Each resource will release all locks held by the transaction upon the completion of the transaction (commit or abort). At this point, other transactions needing access to those data objects can proceed.

1.11.3 Three-Phase Commit Protocol (3PC)

A problem with the 2PC protocol is that data objects are locked until the transaction completes. No other transaction that needs access to those data objects can proceed until the locks are released. Thus, if a resource should fail and cannot respond, the locks will be held for an indeterminate period of time; and the application may stall. This is called a "hung transaction" or a "transaction in doubt."

The above situation is corrected by the Three-Phase Commit protocol (3PC). The 3PC protocol places an upper bound on the time that a transaction may take to commit or abort. It accomplishes this by adding a third phase, a Wait phase, between the Prepare phase and the Commit phase.

The 3PC protocol is shown in FIG. 9. Upon receiving a Commit request from the application, the Transaction Manager enters the Prepare phase (1) and sends a "canCommit?" query to all resources involved in the transaction (2). It then enters the Wait phase (4).

If a resource can commit, it responds with a "Yes" (3). If the resource should time out without receiving a "canCommit?" query, it aborts its transaction. This is the end of the Prepare phase.

In the Wait phase (4), if the Transaction Manager receives a "Yes" response from all resources (3), it sends a "preCommit" message to all resources (5). If it receives a "No" response from any resource, or if it times out waiting for a resource to respond, it aborts the transaction and sends an "Abort" message to all resources. The Transaction Manager then enters the Commit phase (7).

When a resource receives a "preCommit message," it responds with an "ACK" message (6). If the resource times out without receiving a "preCommit" message, it aborts its transaction.

If the Transaction Manager receives an "ACK" message from all resources, it sends a "doCommit" message to all resources (8). However, if the Transaction Manager times out before receiving an "ACK" message from all resources, it aborts the transaction and sends an "Abort" message to all resources.

When a resource receives a "doCommit" message, it commits its transaction and returns a "haveCommited" message (9). If the resource times out without receiving a "doCommit" message, it goes forward with the commit.

If the Transaction Manager does not receive a "haveCommited" message from a resource, it takes no further action. If the resource is still alive, the Transaction Manager knows that the resource has committed the transaction either because it received the "doCommit" message or because it timed out.

By using the 3PC protocol, no transaction will hold locks for longer than the timeout period once the application has requested that its transaction be completed.

1.11.4 BASE Protocol

In a large application deployed across many independent systems under the 2PC or 3PC protocols, a transaction being processed by one system must hold locks on data objects resident on all of the other systems in the application network until the transaction completes. Thus, within a single system, many data objects will be locked by transactions running on other systems. In very large networks, this can impose a severe performance penalty as applications wait for locks to be released.

The BASE protocol (Basic Availability, Soft-state, Eventual consistency) offers a compromise to this challenge. It trades consistency and isolation (two of the ACID properties enforced by the other protocols) for performance.

In distributed application networks, any audited changes applied to the database on one system are applied to the other systems, where normally they would be applied with locking if 2PC or 3PC protocols are being used. However, with BASE, the databases on each system are cached; and data objects are not locked by transactions being executed on remote systems. A transaction on a source system will use its cached database for processing even though the data it is using in its database may be inconsistent and may even be changing because of the execution of remote transactions.

The benefit of BASE is that applications are not held up by locks held by other systems. The downside is that transactions are executed against potentially inconsistent data. This violates the ACID properties of consistency and isolation. Ultimately, the inconsistent data on each system will be updated by the remote executing processes. If all applications on all systems were to be paused, the databases will eventually become consistent. This is called "eventual consistency."

If an application can tolerate stale data caused by eventual consistency, BASE provides a way to significantly improve performance in large, distributed transaction-processing systems.

1.12 Distributed Transactions

Many applications require updates to two or more databases that may be resident in two or more computers. In this case, the Transaction Manager in the system that initiates the transaction manages the transaction across all computers involved in the transaction. As database changes are made to a database in another computer, those changes are sent to the Transaction Manager in that computer so that the Transaction Manager can manage its own database updates.

This process is illustrated in FIG. 10. A transaction is initiated when the application issues a Begin Transaction directive (1) to its Transaction Manager (2). The application then issues database changes (3) that in the case of FIG. 10 are to applied to its own Database A (the source database) (4) in Computer A (5) and to Database B (the target database) (6) in Computer B (7). Changes to Database A are made directly (8) by Transaction Manager A. Changes to Database B are sent (9) by Transaction Manager A to Transaction Manager B (10), which applies them (11) to Database B.

When the application asks that the transaction be committed (12), typically the two-phase commit protocol is used. During Phase 1, the Prepare Phase, the source Transaction Manager asks each of the foreign Transaction Managers if it is ready to commit (13). If a foreign Transaction Manager has successfully safe-stored or applied all of its database changes, it votes "yes" (14). Otherwise, it votes "no."

When all Transaction Managers have voted, the source Transaction Manager enters the Commit Phase. If it has been successful at safe-storing or applying all changes to its database, and if all other Transaction Managers have voted "yes," the source Transaction Manager informs all Transaction Managers involved in the transaction to commit the transaction (15). If any Transaction Manager has voted "no," the source Transaction Manager informs all involved Transaction Managers to abort the transaction.

A simple example of a distributed transaction is the banking application in FIG. 11. A request (1) is made by an end user to transfer $100 from his savings account to his checking account. In this example, checking accounts are maintained by Computer A (2). Savings accounts are maintained by Computer B (3).

The request is received by a Request Process (4). Running in Computer A, the Request Process begins a transaction (5) with its local Transaction Manager (6). The first thing the Request Process must do is to ensure that the user has at least $100 in his savings account. It therefore sends a request (7) to the Savings Account Process (8) running in Computer B and asks for the savings account balance. The Savings Account Process accesses (9) its Savings Account Database (10) and responds to the Request Process with the savings account balance.

Assuming that the savings account balance is sufficient, the Request Process sends a request (11) to the Savings Account Process to debit the savings account by $100. The Savings Account Process debits the savings account balance for this user by $100 (12) via its local Transaction Manager (13) and responds to the Request Process that it has been successful.

The Request Process then requests (14) the Checking Account Process (15) running in Computer A to credit the user's checking account balance by $100 (16). The Checking Account Process adds $100 to the user's balance in the Checking Account Database (17) via its local Transaction Manager (6) and responds with an acknowledgement to the Request Process.

The Request Process now asks its Transaction Manager to commit the transaction (18). The Transaction Manager in Computer A coordinates with the Transaction Manager in Computer B to commit the transaction (19). If the commit is successful, the user is so notified (20).

In each case in this example, the output of a process is a service; and the input to a process is an event. In many instances, the service is the generation of an event to be processed by another process.

The initial user request is an event that is processed by the Request Process. The first action of the Request Process is to generate an event to the Savings Account Process in order to request the savings account balance. The Savings Account Process performs the requested service and returns the savings account balance. The Request Process then generates an event to be processed by the Savings Account Process and requests the debit of $100 from the savings account. The Savings Account Process does so and responds to the Request Process that it has completed the requested action.

The Request Process next generates an event to the Checking Account Process to credit the checking account. When this service has been completed by the Checking Account Process, the Request Process responds with a positive acknowledgement to the end user.

The updates to the Savings Account Database and the Checking Account Database are grouped together into a single audited transaction to ensure that either both updates are made or that neither are made. The transaction takes the following form:

Begin Transaction
Read savings account balance
Debit savings account balance by $100
Credit checking account balance by $100
Commit Transaction If the savings account balance is insufficient, or if either update to a database cannot be made, the transaction is aborted. No database update action takes place.

1.13 Appended Information

Computer applications generally process events based on the information contained within the event. For instance, in FIG. 11's banking application, the information contained in the initial event is the function to be performed (transfer funds), the account to be debited (the savings account number), the account to be credited (the checking account number), and the amount of money to be transferred.

However, in some cases, it is desirable to append additional information to an event or a transaction. This data adds useful attributes to those contained in the initial event or transaction. Such attributes can control how the event or transaction is processed. They might be used, for instance, to invoke additional services for an event. They might be used against a complex rule set to decide whether to modify a transaction or to allow the transaction to proceed. For instance, if the funds in an account are insufficient to cover a transfer, the bank may want to allow the transfer anyway (and charge an overdraft fee). Alternatively, the bank may reduce the transfer amount to reflect the amount currently held in the account.

Additional information may include:

Who—Who initiated the event or transaction? The initiator might be a person, a process, another system, or an external device. As an example, an application processing an event related to the initial event may need to know the person's name, the process name or process ID, the system name, or the serial number of the device that initiated the event or transaction.

What—What was changed? Were the contents of one or more files changed? Was the file structure changed? Did record keys change? Was a record or a file purged? What other operations were performed, such as reads?

Where—From where did the event or transaction originate? What was the terminal ID at which the event or transaction was issued? What was the session ID? Was the event or transaction issued by a mobile device (smartphone, tablet, laptop, computer)? If so, what was the location of the mobile device?

When—When was the event or transaction issued? At what time of day on which date? What was its time relationship with other related events or transactions?

Why—Why was the event or transaction issued? Was it a normally occurring event or transaction? Was it issued to correct a problem? Was it issued to respond to an emergency?

How—How was the event or transaction initiated? Was it from a desktop device or a mobile device? Was it issued from home, from the office, from another internal process such as a batch program, or from some other location? Was it received over the Internet or over a secure corporate communication network?

This information is often available at the time of the event or in a variety of tables or logs maintained by the computing systems. In prior art, the gathering of the information is implemented by special coding in applications and often takes place after the fact. The results are archived for later processing. The information is useful primarily for offline applications, such as post-transaction auditing, regulatory compliance, security policy compliance, and trending.

To meet the challenges of today's changing business environments, it is often necessary to add these attributes and the controls that they impose to existing applications so that actions dictated by the appended attributes can be taken and used in real time. This means that the applications must be modified to incorporate the additional functionality.

1.14 The Event/Tx Tracking Module

It is the responsibility of the Event/Tx Tracking module, also referred to herein as a "tracking engine," to apply additional processing functions to the events or transactions in order to enhance or modify their outcomes in the desired ways. The Event/Tx Tracking module may also gather additional information and append it to the event or transaction. The Event/Tx Tracking module determines all of the required additional information, accesses that information, and appends it to the event or transaction in question.

Though there are many ways in which an Event/Tx Tracking module may be implemented, illustrative examples are shown in FIGS. 12*a* and 12*b*. Note that in these examples, the Event/Tx Tracking module is a function. It comprises a set of code and is not necessarily an executable. How it is executed depends upon how it is integrated into the application, as described later.

The Event/Tx Tracking module (1) may include a Rules Engine (2). The Rules Engine may be integrated with the Event/Tx Tracking module, as illustrated in FIG. 12A; or it may be a separate module that the Event/Tx Tracking module can use, as shown in FIG. 12B. When the Event/Tx Tracking module receives an event or a transaction that it is programmed to process (3), the module may manage the event or transaction in a variety of ways depending upon how the module is implemented. It may add to the event or transaction certain information that is available elsewhere in the system (4) and that can be used to enhance the application's functionality.

The Event/Tx Tracking module may take actions on the event or transaction, such as rejecting or modifying either (5). In many cases, this is the function of the Rules Engine. The Event/Tx Tracking module may send the event or transaction to the Rules Engine, and the Rules Engine will respond perhaps with modifications to the event or transaction. It also may signify that the event or transaction is acceptable or should be rejected.

The Event/Tx Tracking module may generate a modified event or transaction (6) in order to control further downstream processing by application processes. It may invoke other application processes (7) to provide ancillary functions with information about the event or transaction.

The prior art provides methods for an Event/Tx Tracking module to intercept and modify the actions of events through intercept libraries or intermediate processes. However, there is no prior art method to allow an Event/Tx Tracking module to intercept and modify an audited transaction begun by a system facility such as a SQL database manager.

1.15 Controlling Processing Via an Intercept Library

As described earlier in Section 1.6, "Intercept Libraries (IL)," incorporating one or more intercept libraries into an existing application allows functionality to be added without the need for application modifications. The functionality to be provided by Event/Tx Tracking can be added to an existing application via intercept libraries, as illustrated in FIG. 13.

FIG. 13 is only one example of a configuration that can be used to add Event/Tx Tracking via intercept libraries to an existing application, but it serves to illustrate the method. In this example, separate Event/Tx Tracking intercept libraries are used to process incoming events (Event/Tx Tracking-1), database activity (Event/Tx Tracking-2), and outgoing events (Event/Tx Tracking-3).

An application process (1) provides services (2) to its end users. Its typical processing flow is to receive events from external sources (3), to use its database to process the events while making changes to the database pertinent to the events (4), and to generate events to downstream processes for further processing or to other end users (5).

In this illustrative example, Event/Tx Tracking is added to the application to preprocess incoming events, to control the use of the application's database, and to enhance generated outputs to the end users. Separate intercept libraries are provided for each of these functions, although these functions could be incorporated into the same intercept library.

In order to await an incoming event, the application posts a read call on its incoming channel. This is a call to the operating system to monitor the incoming channel for a message and when a message is received, to pass it to the application. However, the Event/Tx Tracking-1 intercept library (6) has been incorporated into the application to intercept the read call to the operating system (7). When a message arrives on the incoming channel (3), it is intercepted and passed to the Event/Tx Tracking-1 module. This module has access to the necessary external information to append to the event if desired (20). The module also can take actions on the event such as rejecting it or modifying it (8). When the module has completed its incoming event processing, it passes the enhanced event to the application process (9) as if it were the operating-system read function that the application had called.

As the application processes the event, it typically will access data in its database (10) and will change that data. It does this via DML call events to the operating system (read, insert, update, and delete) and at times via DDL calls to modify the structure of the database. These database calls may be part of an audited transaction, an unaudited transaction, or simply one or more unrelated database operations. An Event/Tx Tracking-2 intercept library (11) is incorporated into the application to intercept the DML/DDL commands (12). When a database command is made by the application (4), the database manipulation event is intercepted by the Event/Tx Tracking-2 intercept library. The library can process the database call in any way it desires (13). It can optionally use additional information resident elsewhere in the system (20). It can modify the database operation, it can reject it, or it can perform any other desired operation. When the intercept library has completed its processing and has applied the resulting modified operation to the database (14), it responds to the application as if it were the operating-system database command that the application originally called (15).

Outgoing events generated by the application are handled in a similar way by Event/Tx Tracking. An Event/Tx Tracking-3 module (16) is incorporated into the application to intercept (17) application calls (5) requesting that the operating system send a message to another process or end user. The Event/Tx Tracking-3 intercept library intercepts these calls and sends them to the Event/Tx Tracking-3 module. This module applies whatever changes are desired to modify or to reject the outgoing event (18), optionally using additional information available in the system (20). When the module has finished its processing, it sends the enhanced outgoing event to downstream processes or to end users (19) as if it were the operating-system call that was originally invoked.

The above illustrations of the functions of the intercept libraries describe additional information, if any, as being physically attached to the modified events or transactions. Alternatively, the intercept libraries might logically attach such information by maintaining it in an area separate from the events or transactions. In this case, the intercept libraries will know where to find the additional information referenced in the event or transaction.

The use of intercept libraries bears the risk of improper configuration, in which one or more libraries are not linked into application processes as intended. If this occurs, the intended information-flow monitoring and control will not be provided. Many applications have hundreds or even thousands of processes, and ensuring the proper configuration of intercept libraries into the application can be a daunting task.

In addition, intercept libraries increase the path length of application execution, thus slowing down response times. Also, intercept libraries cannot be inserted into certain audited transactions initiated by system facilities.

1.16 Controlling Processing Via an Intermediate Process

Implementing Event/Tx Tracking as one or more intermediate processes is similar to the intercept-library implementation described in FIG. 13. However, instead of an intercept library, the Event/Tx Tracking module is implemented as one or more stand-alone processes that are inserted between other processes. FIG. 14 is only one configuration that can be used to add Event/Tx Tracking to an existing application via intermediate processes, but it serves to illustrate the method.

With reference to FIG. 14, an application process (1) provides services to its end users. Its typical processing flow is to receive events from external sources (2), to use its database to process the events while making changes to the database pertinent to the events (3), and to generate events to downstream processes for further processing or to other end users (4).

In this illustrative example, Event/Tx Tracking is added to the application to preprocess incoming events, to control the use of the application's database, and to enhance generated outputs to the end users. The intermediate processes Event/Tx Tracking-1, Event/Tx Tracking-2, and Event/Tx Tracking-3 are provided for each of these functions.

The Event/Tx Tracking-1 process (5) is positioned between the incoming event (2) and the application process so that it can intercept and enhance incoming transactions before these events are sent to the application process (6).

The Event/Tx Tracking-2 process (7) is positioned between the application process and the database (8) so that it can intercept database manipulation events (3) issued by the application process and can modify or control these commands (9), (10). These database calls may be part of an audited transaction, an unaudited transaction, or simply may be one or more unrelated database operations. Event Tx Tracking-2 may be positioned anywhere that it can intercept database command events. As examples, it may be positioned between the application and the file system or between the file system and the disk processes so that all database commands flow through it. The intermediate process cannot be inserted into the processing flow of an audited transaction begun by a system facility such as a SQL database manager.

The Event/Tx Tracking-3 process (11) is positioned in the stream of events (4) generated by the application process. In this way, it can modify and control the events to be sent to downstream processes or to other end users (12).

All Event/Tx Tracking modules may have access to additional information resident in the system (13) and optionally can use that information to enhance or control their processing of events or transactions.

In this example, when an event arrives from an external source, the Event/Tx Tracking-1 process receives the event and applies enhancement and control functions. It then passes the modified event to the application process.

As the application process provides its services relative to the modified event, it may read data from its database and may make changes to its database. These database command events are intercepted by the Event/Tx Tracking-2 process, which can exercise its own control and enhancement.

Upon completion of the event processing, the application process may generate an outgoing event that is to be passed to other downstream processes or to other end users. The Event/Tx Tracking-3 process intercepts the outgoing event and adds controls and enhancements before passing it on as an enhanced outgoing event.

The above illustrations of the functions of the intermediate processes describe additional information that may be physically attached to the modified events or transactions. Alternatively, the intermediate processes might logically attach this information by maintaining it in an area separate from the events or transactions. In this case, the intermediate processes will know where to find the additional information.

As is the case with intercept libraries, the use of intermediate processes bears the risk of improper configuration, in which one or more processes are not injected into the processing flow as intended. If this occurs, the intended information-flow monitoring and control will not be provided. Many applications have hundreds or even thousands of processes, and ensuring the proper configuration of intermediate processes into the application can be a daunting task.

In addition, intermediate processes increase the path length of application execution, thus slowing down response times. Also, intermediate processes cannot be inserted into certain audited transactions initiated by system facilities.

1.17 An Example of Event/Tx Tracking—Implementing New ATM Policies

An example of how Event/Tx Tracking can add functionality to an existing program without requiring changes to the program appears in FIG. 15. A legacy application (1) manages a bank's ATMs. Its functions are to receive ATM requests (2) that include as parameters the amount requested, the credit-card or debit-card number, and the ATM's IP address. The application process checks the cardholder's account in the card database (3). If the account balance covers the withdrawal request, the application returns an approval (4) to the ATM to issue the requested amount.

The bank has decided to add stricter rules to its approval of ATM withdrawals and has created a Rules Engine (5) that governs whether a transaction can or cannot be authorized without modification. FIG. 15 illustrates the use of Event/Tx Tracking to implement one of these rules without the need for application modification. The specific rule in question is that any particular ATM may only issue a restricted amount of cash to a credit- or debit-cardholder on any single day. Three Event/Tx Tracking modules are added to the application to modify incoming events, database accesses, and generated responses. The modules are shown in FIG. 15. Though FIG. 15 shows the Event/Tx Tracking modules as being implemented as prior art intermediate processes, they also may be implemented as prior art intercept libraries.

When, for example, a cash-withdrawal request for $1,000 (2) is received by the application, the request is intercepted by the Event/Tx Tracking-1 module (6). This module accesses the ATM location from the communication subsystem (7) and replaces the ATM IP address (such as 192.23.106.255) with the ATM location (such as PNC Lobby Blairstown N.J. USA) in the incoming event. We assume that this change in value is transparent to the application due to the way the application is coded. The modified event containing the ATM location (8) is passed to the application.

According to the logic built into the original ATM application, it determines that the cardholder's account is sufficient to cover the withdrawal and will issue a command to the card database to debit $1,000 (9). This command will include the amount, the card's account number, and the ATM location.

The database command will be intercepted by the Event/Tx Tracking-2 process (10). This process will access the Rules Engine (5) and will find that for this particular ATM, no cardholder may withdraw more than $500 in any one day. The process will then access the card database (11) and will determine that the cardholder already has withdrawn $300 from this ATM on the same day. Therefore, the cardholder is authorized to withdraw only $200. The Event/Tx Tracking-2 module will debit the cardholder's account by $200 (12) and will reply to the application that the update has been made (13)

Thinking that the entire $1,000 has been deducted from the cardholder's account, the application will issue a directive to the ATM to issue $1,000 (4). However, this event is intercepted by the Event/Tx Tracking-3 process (14). It has access to Event/Tx Tracking-2's decision that only $200 is to be issued (15). Event/Tx Tracking-3 also has access to the communication subsystem so that the address of the ATM can be returned from its location to its IP address (16). Event/Tx Tracking-3 will modify the application's response to one that authorizes the ATM to issue only $200 (17).

This example is prior art and reflects how an application's functions can be significantly modified by Event/Tx Tracking without making any modifications to the application.

1.18 Data Replication

Many applications require a local or remote copy of the application database to be maintained and to be kept synchronized with the source database. For instance, a system backing up a primary system needs an up-to-date copy of the primary system's database so that it can continue processing should the primary system fail. An active/active system, in which all processing nodes are cooperating in a common application, requires that all nodes have a copy of the current application database so that they can process transactions routed to them. The synchronization of databases is accomplished by data replication.

With data replication, changes made to the source database are sent via a communication channel to the target environment, where they are applied to the target database. The source and target databases may be collocated, or they may be remote from each other. There are three types of data replication:

i. Asynchronous Replication acquires database changes from a change log, a database trigger, or some other method to acquire the application database changes and sends them to the target database. Consequently, the target database lags the source database in time. This time difference is known as replication latency. Should the source system fail, any changes that were generated during the replication latency interval may not make it to the target system and consequently may be lost. Furthermore, replication latency allows data collisions. A data collision occurs if changes are made to the same data object in two different copies of the application database within the replication latency interval. Both changes will be replicated to the other systems, overwriting the changes originally made. Now both databases are different, and both are wrong.

ii. Synchronous Replication ensures that no data will be lost in the event of a source system failure. The source database will not complete a change to its database until it is assured that the change has arrived at or has been applied to the target database. Furthermore, the source system will not commit a transaction until it knows that the target system has at least received the transaction or that it can commit the transaction. Thus, should the source system fail, the target system will have all of the changes made by the source system. Furthermore, since each system locks a data object before it is changed, data collisions are eliminated. However, since the source system now has to wait for the target system to complete its actions, applications are slowed. This additional time required to complete a source application's transaction is known as application latency. Application latency may limit the distance by which two systems can be separated—typically by only tens of kilometers.

iii. Coordinated Commits is a synchronous replication technique that reduces application latency to a great extent. Changes are replicated asynchronously so that the application is not delayed. It is only at commit time that the source system must wait for the target system to acknowledge that it has received all of the data or that it can commit the transaction. Certain configurations of coordinated commits also can eliminate data collisions.

1.18.1 Asynchronous Replication

FIG. 16 provides an example of an asynchronous replication engine. A source system (1) contains a source database (2), whose contents are to be replicated to a target database (3) on a target system (4). When the application (5) in the source system issues a begin transaction directive (6) to its Transaction Manager A (7), Transaction Manager A initiates a transaction and inserts a begin transaction token (8) into the source system's change log (9). This token is read by the data replication engine's Collector (10) and is sent (11) to the target system via a communication channel (12).

At the target system, the data replication engine's Consumer (13) receives the begin transaction token and passes it to the target system's Transaction Manager B (14), which begins an independent transaction on the target system.

Thereafter, as the application issues database changes (15), the changes are applied to the source database (16) by Transaction Manager A, which inserts each change (17) into the change log. The Collector reads the changes and sends them (18) over the communication channel to the target's Consumer, which passes them to Transaction Manager B for writing (19) to the target database.

When the application issues a commit request (20) to its Transaction Manager, Transaction Manager A commits the transaction on the source system and inserts a commit token (21) into the change log. The commit token is replicated (22) to the target system, where the target system's Transaction Manager B commits the transaction on the target system.

The replication latency introduced by asynchronous replication is the time from when a change is made to the source database to the time that it is made to the target database. In this example, the change must be placed in the change log, the Collector must read it and send it to the Consumer, and the Consumer must apply it to the target database. Replication latency can range anywhere from a fraction of a second to minutes depending upon the design of the replication engine and other factors such as the speed of the interconnecting network.

1.18.2 Synchronous Replication

FIG. 17 illustrates an example of prior art synchronous replication. The method shown in FIG. 17 is known in the prior art as "dual writes" because each change is written independently to both databases. With synchronous replication, no change is complete at the source system until it is guaranteed that the change has been safe-stored or applied to the target system.

An application (1) begins a transaction by issuing a begin-transaction directive (2) to its Transaction Manager (3). The Transaction Manager knows that the transaction is to be applied to two application databases, a source application database (4) on the source system (5) and a target application database (6) on a target system (7). Though the target application database is shown in FIG. 17 as being on a different system from the source application database, they may both be resident on the same system.

As the application issues database changes (8), the Transaction Manager applies these changes to the source application database (9) and, using the interconnecting network between the systems (10), applies the same changes to the target application database. It also enters information about each change into its change log (11). The Transaction Manager does not notify the application that a change is complete until it is assured that the changes have been applied to each database. Note that in many cases, the target set of changes are applied by the application itself or by a library, process, or remote file system acting on behalf of the application.

When the application issues a commit transaction directive (12), the Transaction Manager knows that all changes have been applied to both databases and that the databases are therefore in synchronization. It commits the transaction, enters a commit token into its change log and informs the application that the transaction has been committed.

Because the source system must wait for each update to complete on the target system, the processing time of a transaction is extended. This delay is called application latency. Application latency is partially a function of the distance between the source and target systems. The further apart the systems are, the longer it takes for signals to propagate between them. Thus, application latency typically limits the distance between the source and target systems to campus or metro environments in which they are separated by no more than tens of kilometers.

1.18.3 Coordinated Commits

Coordinated Commits is a synchronous replication technique that combines asynchronous replication with synchronous replication to ensure no data loss but without imposing a distance restriction on the separation of the source and target systems. An example of a Coordinated Commits replication engine is shown in FIG. 18.

The Coordinated Commits replication engine is a modified asynchronous replication engine, as described in Section 1.18.1, "Asynchronous Replication." It includes a Coordinator process whose job it is to manage the commit of the transaction at the source and target systems. When the application first begins a transaction, the Coordinator joins the transaction so that it can be a voting resource. It may do this explicitly via an intercept library or via an API provided by the application, as described in Section 1.9.1, "Explicit Joining,", or it may join it implicitly as described in Section 1.9.2, "Implicit Joining." FIG. 18 shows the Coordinator explicitly joining the transaction. It receives a transaction ID from the application (1) and uses this ID to make a request (2) to Transaction Manager A to join the transaction. It is now a voting resource for the transaction.

Up until commit time, normal asynchronous replication proceeds, as described earlier. When the application begins a transaction and a database change is sent to the target system under that transaction, the target system Transaction Manager B begins an independent transaction and applies the change to its database under that transaction. All further changes are made both to the source database by the application and to the target database by the replication engine.

However, when the application requests that the transaction be committed, the replication engine switches to synchronous mode. The source Transaction Manager A enters the Prepare phase of the two-phase commit protocol. It asks the target system if it is ready to commit. It does this by asking the Coordinator if it is ready to commit (3). The Coordinator asks the Consumer (4) on the target system if it is ready to commit (5). If the Consumer has been able either to safe-store or to apply all of the database changes, it will reply with a "yes" vote (6) to the Coordinator.

When the Coordinator receives the "yes" vote from the Consumer, it sends a "yes" vote (7) to the source Transaction Manager A. When Transaction Manager A receives a "yes" vote from all transaction participants, it enters the Commit phase of the two-phase commit protocol. It commits the transaction on the source system and inserts a commit token (8) into the change log. The commit token is replicated (9) to the target Transaction Manager B (10), which will commit the transaction on the target system.

If the target Transaction Manager B or any other transaction participant cannot commit the transaction, it returns a "no" vote to the source Coordinator, which passes it to the source Transaction Manager A. Transaction Manager A will abort the transaction on the source system and will insert an abort token into the change log to inform the target Transaction Manager B to abort its transaction.

Thus, all database changes within a transaction are guaranteed to be made either to both source and target systems or to neither system. No data is lost should the source system or network fail. Furthermore, since the only delay to the source application is having to wait for the target system to vote, application latency is significantly reduced relative to standard synchronous replication, described in Section 1.18.2, "Synchronous Replication." With Coordinated Commits, the systems can be separated by great distances and still provide excellent performance.

In the above description, it is said that "If the Consumer has been able either to safe-store or to apply all of the database changes, it will reply with a 'yes' vote (6) to the Coordinator." There is an important difference between whether the Consumer replies with a "yes" vote only if the data has been safe-stored or if it has actually been applied to the database.

If the data has been safe-stored but not applied to the database, then no data will be lost if the source system or interconnecting network should fail. This is known in the industry as Zero Data Loss, or ZDL. However, if the systems are running in an active/active mode in which both systems may be actively processing transactions, data collisions may occur. A data collision occurs when applications in different nodes change the same data item at almost the same time (within the replication latency interval). In this case, each change will be replicated to the other system and will overwrite the update made by the application in that system. Now both systems have different values for the data item and both are wrong.

However, if the data actually has been applied to the target database, then all such data items are locked and cannot be changed until commit time at which time they are unlocked. Thus, it is not possible for another application to change one of these data items, and not only will no data be lost but there will be no data collisions.

If the Coordinator joins the transaction via implicit joining, there are several ways in which such joining can be implemented. Some examples are:

i. The Transaction Monitor can be modified to always register the Coordinator for all or for a specific subset of transactions upon startup.

ii. The Coordinator can be a persistent process object that runs under a persistence monitor to ensure that it is always up. The Coordinator will perform an implicit join as part of its startup procedure before the application starts. The system will not start without it.

1.18.4 Queue Manager (QMGR)

The capabilities of the Coordinated Commits replication engine can be enhanced via a Queue Manager (QMGR) resident on the target system, as shown in FIG. 19. There are two useful configurations for the Queue Manager. In one, the Queue Manager is the voting resource and votes whether or not to commit the transaction. In the other configuration, the Consumer is the voting resource.

The operation of the Queue Manager is similar whichever configuration is used and is shown in FIG. 19. Changes (1) sent to the target system by the source-system Collector are received by a QMGR (2). The QMGR typically queues the changes in a memory buffer and optionally writes the buffer (3) to persistent storage (4) when the memory buffer fills.

In addition, QMGR sends the changes (5) to the target system's Consumer (6), which sends the changes to the target-side Transaction Manager for writing to the target database (7).

Writing changes to a sequential queue is much faster than applying random changes to a database. Thus, if the Consumer gets behind, it can read changes from the queue via QMGR rather than slowing down the delivery of the data from the source-side Collector.

Another advantage of using a Queue Manager is that the target database can be taken offline for maintenance or upgrading. All data changes that are made during the offline period are stored in the QMGR's queue and can be applied to the target database when it is returned to service.

1.18.4.1 Queue Manager Votes

The configuration in which the Queue Manager is the voting resource is shown in FIG. 19. In this example, the RTC? request-to-commit request (8) is received by the QMGR. The QMGR optionally flushes its memory-resident buffer to persistent storage. (This step is optional/configurable because it would take a dual failure, i.e., both the source and target environments, to lose the data. Some customer implementations acknowledge and accept this risk.) Knowing that all database changes have now been safe-stored on the target system, the QMGR responds to the source-side's Coordinator that it is ready to commit (9). The commit process described in Section 1.18.3, "Coordinated Commits," is then followed.

By using this technique, the source system does not have to wait for the database changes to be applied to the database. Consequently, application latency is significantly reduced. This configuration provides for zero data loss in the event of a source system failure.

However, since the target data to be changed is not locked prior to the commit, data collisions still can occur when running in an active/active architecture.

1.18.4.2 Consumer Votes

The configuration for the Consumer to be the voting resource can be seen in FIG. 20. In this case, the RTC? request (8) is sent by the QMGR to the Consumer (9). The Consumer completes the changes to the database for this transaction and responds to the source-side Coordinator with a ready-to-commit indication (10). The commit process described in Section 1.18.3, "Coordinated Commits," is then followed.

In this case, the source system does not have to wait for each change to be applied individually to the database, but it must wait for all of the database changes to be completed before it can commit. Thus, application latency is reduced but not to the extent of the Queue-Manager-Votes configuration, described above. However, since each data object is now locked prior to the commit before the data object can be changed, data collisions will not occur when running in an active/active configuration.

1.18.4.3 QMGR on Source System

The QMGR also can be resident on the source system. This will speed up the source-side Collector and will provide a source of database changes if the network fails, is slow, or the target Consumer should fall behind. However, in this configuration, the QMGR will typically not be the voting resource. The target-side Consumer must be the one that votes, since only it knows if all data changes have been received and optionally safe-stored and/or applied to the target database.

1.18.5 User Exits

Every process in a data replication engine can have user exits to provide additional functionality. User exits allow a process to make decisions during the processing cycle about the data and transactions being replicated. This includes the Collector, the Coordinator, the Queue Manager, and the Consumer. User exits may use a Rules Engine to determine actions to take. These user exits may even be part of a Tx/Tracking Engine or separate from it.

For instance, each process could decide whether to encrypt data-in-flight flowing through it. All data in flight could be encrypted or only certain fields. The Consumer could decide whether to encrypt data-at-rest. Again, it could elect to encrypt all data or just certain fields. If encryption is not allowed due to federal regulations, a process may elect to obfuscate certain data, for instance by tokenizing it and/or replacing it with "x" s.

The Coordinator is in a position to determine whether a transaction should be synchronously replicated or whether it can be replicated asynchronously. If it can or should be replicated asynchronously, the Coordinator will not join the transaction. However, if it must be replicated synchronously, the Coordinator will join the transaction.

Configuration information can be used, for example, to tell the Coordinator which data (e.g., tables), transactions, or even user IDs making changes should be done asynchronously or synchronously.

1.19 What is Needed

Adding automated logging of all or selected application and database activity, whether directly generated by the application or on behalf of the application by system functions, is useful for auditing the activity that occurs on the system. This provides post-mortem forensic review capabilities to determine the answers to questions such as who did what, when, from where, and how often. For example, while a database maintains the current value of an account balance, it is often useful to know how often that account balance went to zero or was overdrawn, thereby leading to possible upselling of overdraft services.

Many functions would be valuable to existing applications if additional information was available to them in real-time for the events they were processing and for the transactions they were generating, and additional controls on how the data is processed and/or distributed can be achieved without necessarily changing the applications themselves. For instance, with respect to events:

i. A user's login request can be denied if it is coming from an unsecured or unknown source device such as a terminal.
ii. A credit-card purchase can be denied if the item was purchased after the merchant's known closing hours.
iii. The sending of sensitive personal information to an unknown destination can be blocked.
iv. An employee termination that violated union rules can be reversed.
v. A request for an unapproved capital expenditure can be routed to the CFO.
vi. The forwarding of sensitive documents can automatically be restricted to only those with a need to know.
vii. The forwarding of sensitive documents can manually be restricted by requesting the user to swipe a fingerprint scanner attached to their computer to validate the recipient.
viii. The contents of the event itself can be filtered, transformed, altered, removed, enhanced or added to depending on the user making the request and/or the time of day the request is being made.
ix. Sensitive data can be encrypted or obfuscated based on user ID, device location, or network path.
x. In a data replication environment, additional controls such as sensitive data filtering can be placed on the events to be replicated that is not necessarily required in the source environment.

With respect to transactions, certain controls can be applied or the transactions can be modified to make them acceptable. For instance:

i. Access to sensitive data by an unauthorized person can be denied.
ii. A request to withdraw from an ATM an amount of cash that exceeds the cardholder's limit can be approved or reduced to the limit.
iii. A request to transfer funds from one account to another can be denied or reduced to reflect the actual balance in the debited account.

iv. A request to transfer funds from one account to another can be compared to aggregate transfer thresholds for the sending or receiving account and either denied or adjusted to make the amount not exceed a pre-set or dynamic threshold.
v. A particular user can automatically be blocked from updating certain files or tables.
vi. A particular user can be suspended or delayed while a manual process (such as having the user call a pre-registered cell number) validates additional information about the user making the request.
vii. In a data replication environment, additional controls such as filtering sensitive data that is sent to the target environment can be placed on the transactions to be replicated that is not necessarily required in the source environment.
viii. In a data replication environment, the value of the transaction or the member that the account belongs to can be used to determine if the transaction should be replicated synchronously to guarantee delivery, or asynchronously if deemed less important.

In some cases, much of this functionality can be added to an application by the use of prior art intercept libraries and intermediate processes to modify and control events. However, it is impossible to insert these elements directly into the processing stream of certain transactions initiated by the system.

Furthermore, the use of intercept libraries, intermediate processes, and similar techniques is risky, as the intercept libraries and intermediate processes may have to be configured for hundreds or even thousands of processes in large applications. It is quite possible that configuration errors will prevent certain monitoring or control functions from being executed properly.

Moreover, the use of intercept libraries and intermediate processes is inefficient, as they extend the processing-path length of transactions. Their processing is sequentially inserted into the normal processing flow of the transaction.

Over time, requirements have grown for the control of the actions executed by events and transactions for many applications; and the applications were never written to provide these functions. The modification of old legacy applications is risky and costly, if even possible. Many were written decades ago in languages that are not well-known today, such as Cobol, Fortran, and PL1. Computer science majors today learn Java. Often, the original code for the applications is lost; and the structures of such applications are mysteries to those that must maintain them.

What is needed are:
i. methods to construct facilities to provide the added functionality required to log, control, or modify the actions of audited transactions, including those generated by system functions, with such added functionality optionally based on additional information.
ii. methods to construct facilities that will automatically add to audited transactions, including those generated by system functions, the additional attributes that may be required by today's applications.
iii. methods to allow these facilities to vote as to whether a transaction should be committed or aborted.
iv. methods to automatically produce an audit log of who did what, from where, and when.
v. methods to extend these facilities to transactions that are being replicated to other systems.
vi. methods to integrate these facilities with existing applications without the need for code modifications in order to provide new controls or services.
vii. methods that do not appreciably extend the path length or that minimize the effect of the path length of the processing of transactions.
viii. methods that are reliable and that are not subject to configuration errors.
ix. methods that can be readily or dynamically changed as the needs and requirements of the application change, without having to recode and test the application.
x. methods that can allow the logging, monitoring, and control of the application requests to dynamically be changed without having to take an application outage.

BRIEF SUMMARY OF THE INVENTION

The present invention teaches methods that allow the processing of an audited transaction to be automatically logged, controlled, or modified by adding additional processing functionality and/or ancillary information to it in real time without the requirement for application code changes. The additional processing functionality and/or information can be used to enhance applications for purposes of security, for adherence to regulatory requirements, for new business policies and applications, and for many other purposes.

Having real-time access to this additional processing functionality and/or appended information greatly expands the usefulness of an audited transaction. For example:
i. An audit log of detailed information can be generated automatically.
ii. Authentication of users and authorization for them to access particular information can be restricted based on the additional data appended to the transaction. For instance, a user making requests from an unsecured mobile device may have fewer privileges than one using a secured corporate terminal.
iii. Potential security breaches can be detected immediately. For instance, if a user with a valid password is trying to log on to the system from an unauthorized terminal, the logon can be rejected. If there is unusual activity against a table or a database, security personnel can be alerted to look for fraudulent activity. If data is being routed to an unknown log or to an unknown external system, it can be blocked.
iv. Transactions can be allowed or rejected based on a set of complex rules. For instance, credit-card and debit-card transactions can be checked with a rules engine that will authorize or deny the transactions. Certain country codes, zip codes, merchant categories, issuing institutions, card types, and transaction types can be restricted. Limits may be imposed on total card activity within a given period of time.
v. The processing of transactions can be modified to meet certain rules. For instance, the reading of a row of a file or table to which the user is not allowed access can return a null value. If the dollar amount of a transaction violates certain rules, the amount can be modified so that the transaction can proceed.

The ability to control transactions and optionally to append useful information to them is implemented by extending the audited transaction processing with one or more Event/Tx Tracking modules. An Event/Tx Tracking module is a program or function that identifies the transaction passed to it, whether any additional attributes should be appended to the transaction, and the additional functions that should be performed based on the transaction data and/or the extra attributes.

The functions that can be performed by the Event/Tx Tracking module are dynamic and can change or adapt over a period of time. In particular, the rules set governing the actions of the Event/TX Tracking module can be dynamically or statically updated to provide new functionality as necessary, in some cases without affecting the overall application processing. The functions that can be performed by the Event/TX Tracking module are unlimited and include automatically logging the details of the transaction, rejecting the transaction, modifying the transaction, controlling the processing of the transaction, and invoking ancillary services based on the added attributes of the transaction.

A novel method to extend transaction processing with an Event/Tx Tracking module applicable to audited transactions being processed under the 1PC, 2PC, 3PC, BASE, or other similar transaction protocols is for the Event/Tx Tracking module to join the transaction as a monitoring or voting member. See Section 1.11, "Transaction Management Protocols," and Section 1.9, "Joining a Transaction." In that way, the Event/Tx Tracking module can log and/or influence the processing of a transaction as it proceeds. Using this approach, the Event/Tx Tracking module can be dynamically changed, and replaced with a new Event/Tx Tracking module with new processing rules, without having to take an application outage. For instance, the Event/Tx Tracking module can vote to abort the transaction if the transaction violates a rule set; or it can modify the transaction to be compatible with the rule set. Furthermore, in a replicated environment, the Event/Tx Tracking module can impose one set of rules on the source data and a totally different set of rules on the target data.

DEFINITIONS

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table and/or file."

Column—A table component that holds a single attribute, such as SALARY, of the entity set.

Field—A file component that holds a single attribute, such as SALARY, of the entity set. In this specification, the term "column" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row and/or record."

Data Object—A specific column or field in a specific row or record.

Database—A collection of related tables or files.

Key—A column that contains a value that identifies its row or another row in the database (a foreign key).

Data Manipulation Language (DML)—The operations that control a database's contents, such as insert, update, delete, and read a row or record.

Data Definition Language (DDL)—The operations that control a database's structure, such as add or delete a column or a table.

Function—A logical implementation of a task or service.

Program—An executable set of programming code for providing a specific function or set of functions.

Executable—A program.

Process—A program running in a computer. A process provides one or more functions. One program can be spawned as multiple distinguishable processes.

Program Identifier—A unique identification of a program or a process.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that the application provides.

User ID—A unique identification of a user.

Event—A request, indication, or other stimulus sent to an application process for processing. Events are often sent as interprocess messages.

Intercept Library—A program that can be incorporated into an executable to intercept application activity and to modify or enhance that activity. It typically requires no changes to the application. The application activity that is intercepted is often application calls to the operating system.

Intermediate Process—A process that can be inserted between two other processes to intercept application activity and to modify or enhance that activity.

Audited Transaction—A delimited set of database operations (inserts, updates, deletes, reads, create tables, and/or purge tables, etc.) that are either all made or none are made. An audited transaction is guaranteed to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions typically maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive that indicates the beginning of an audited transaction. A begin transaction directive may be explicit, or it may be implicit such as with the first database operation for a transaction.

Begin Work—Equivalent to Begin Transaction.

Commit Transaction—A directive that indicates that an audited transaction has successfully completed.

Commit Work—Equivalent to Commit Transaction.

Abort Transaction—A directive that indicates that an audited transaction has been unsuccessful and should be undone.

Rollback Work—Equivalent to Abort Transaction.

Uncompleted Transaction—A transaction that has begun but has been neither committed nor aborted.

Lock—While a data object, row, or table is locked, no other transaction can modify that data object, row, or table or read it (except in the case in which "dirty reads" are allowed). A data object, row, or table that is being changed by an audited transaction is locked until the transaction commits or aborts. A data object, row, or table that is being changed by an unaudited transaction is typically locked only for the duration of the single event being processed.

Dirty Read—A read of a locked data item. Either the before value or the after value will be returned depending upon the state of the locked data item at the time of the read.

Read Committed—A read of a locked data item. The value of the data item before the lock is returned.

Transaction Manager—A facility for managing the updating of a database with transactions. For audited transactions, a transaction manager ensures that changes to a database maintain the ACID properties.

Resource—A database, process, or other entity that can participate in a transaction.

Resource Manager—A process or other entity that manages a resource. It accepts updates from the Transaction Manager, responds to the Transaction Manager during the Prepare phase of the 2PC protocol indicating whether or not its resource can commit the transaction, and executes a commit or abort directive received from the Transaction Manager. The resource manager provides a common interface between its resource and the Transaction Manager.

Transaction Log—A file of all changes made to a database by a transaction manager.

Change Log—A transaction log.

Audit Trail—A transaction log.

One-Phase Commit (1PC)—A protocol for ensuring that an audited transaction affecting a single database or other resource maintains the ACID properties. In contrast to the 2PC protocol, there is no Prepare phase, only a Commit phase. In the Commit phase, the Transaction Manager informs the resource to commit the transaction if it has not been previously aborted. The resource will inform the Transaction Manager as to whether it was able to commit the transaction or if it had to abort the transaction.

Two-Phase Commit (2PC)—A protocol for ensuring that an audited transaction distributed over two or more databases or other resources maintains the ACID properties. In the first phase, the Prepare phase, the Transaction Manager asks each resource if it is prepared to commit. Each resource votes with a "yes" or a "no." In the second phase, the Commit phase, the Transaction Manager informs all resources to commit the transaction if they all voted "yes." If one or more resources voted "no," the Transaction Manager informs all resources to abort the transaction.

Three-Phase Commit (3PC)—A protocol for ensuring that an audited transaction distributed over two or more databases or other resources maintains the ACID properties. It is similar to the Two-Phase Commit protocol except that added is a waiting phase that allows the transaction to abort on timeouts. This permits the release of locks that otherwise will remain indefinitely with the 2PC protocol if a resource doesn't respond.

BASE (Basic Availability, Soft-state, Eventual consistency)—A transaction protocol that avoids locking. It sacrifices the consistency and isolation properties of ACID transactions to allow greater system scalability and performance. The ACID properties of atomicity and durability, however, are preserved.

Joining a Transaction—A method for appending a program module or function to the processing stream for an audited transaction. This allows the module or function to log, monitor, alter, and/or be a voting member of the transaction without adding to the processing length of the transaction.

Explicit Join—A join of a module or function to a transaction by interaction between the module or function and the application initiating the transaction.

Implicit Join—A join of a module or function to a transaction by the Transaction Manager.

Encryption—The process of encoding a message so that it can be read only by the sender and the intended recipient.

Obfuscation—A practice used to intentionally make something more difficult to understand.

Data Replication—Transferring data changes from a source database to a target database to maintain the two databases in synchronization.

Asynchronous Data Replication—Replicating data changes to a target database after the data changes have been applied to the source database. In the event of a source system failure or network failure, some data changes may be lost and may not make it to the target system.

Synchronous Replication—Safe-storing the data changes on the target system as part of the source's apply sequence such that (or in a way that) no data is lost if the source system fails. In the event of a source system failure or network failure, no data changes will be lost by the target system once that data has been delivered to the target system.

Replication Latency—The delay from when the source database is updated to the time that the target database is updated when using asynchronous replication.

Data Collisions—The changing of the same data object in a source database and a target database within the replication latency interval in an asynchronous data replication system. It causes the original changes to be overwritten by the replicated changes.

Application Latency—With synchronous replication, the delay imposed upon application processing due to having to wait for data safe-storing, database changes, and/or transaction commits to be completed at the target database before they can be completed at the source database. Application latency generally requires that the network communication interconnect between the source and target systems have low communications network latency.

Coordinated Commits—A data replication method using asynchronous replication to replicate data changes from a source system to a target system but in which the data changes must be safe-stored or applied on the target system before the source system can commit. Coordinated Commits provides the advantages of synchronous data replication in that no data changes will be lost upon a source system or network failure and that there will be no data collisions when the data has been fully applied to the target database. It provides the advantages of asynchronous replication in that there are no distance limitations between the source system and the target system.

Source Database—The database that is to be replicated.

Source System—The system holding the source database.

Target Database—The database to which data is being replicated.

Target System—The system holding the target database.

Collector—A process running on a source system. The process accesses database changes from a change log or other audit trail to be replicated to a target database over a communication channel.

Extractor—A Collector.

Consumer—A process running on a target system. The process receives database changes over a communication channel from a Collector and applies them to a target database.

Applier—A Consumer.

Queue Manager (QMGR)—A process for temporarily storing changes to a target database in a queue of changes until they can be applied to the target database. The QMGR can be resident either on the source system or on the target system.

Event/Tx Tracking Module—A function designed to monitor, log, modify, and/or append useful information to an event or to a transaction and to potentially exercise certain controls over the transaction's processing.

Tracking Engine—An Event/Tx Tracking Module.

Logging—Recording events in a persistent storage medium.

Logging Engine—A process or program that logs events to persistent storage.

Selection Engine—A process or program that identifies uncompleted transactions for an Event/Tx Tracking module to join.

BRIEF DESCRIPTION OF THE DRAWINGS

Preferred embodiments of the present invention will now be described by way of example with reference to the accompanying drawings:

FIG. 1 shows a prior art architecture of a computer application.

FIG. 2 shows a prior art use of an intercept library to add functionality to an application with no application changes.

FIG. 3 shows a prior art use of an intermediate process to add functionality to an application with no application changes.

FIG. 4 shows a prior art resource explicitly joining a transaction via an intercept library.

FIG. 5 shows a prior art resource explicitly joining a transaction via an API provided by the application.

FIG. 6 shows a prior art resource implicitly joining a transaction.

FIG. 7 shows the prior art one-phase commit protocol.

FIG. 8 shows prior art functions of a Transaction Manager and the two-phase commit protocol.

FIG. 9 shows the prior art three-phase commit protocol.

FIG. 10 shows a prior art distributed transaction.

FIG. 11 shows a prior art example of a distributed application in which events generated by one process are passed to another process for further action.

FIGS. 12A and 12B show the prior art general structure of an Event/Tx Tracking module.

FIG. 13 shows the prior art implementation of Event/Tx Tracking as one or more intercept libraries.

FIG. 14 shows the prior art implementation of Event/Tx Tracking as one or more intermediate processes.

FIG. 15 shows a prior art example of the use of Event/Tx Tracking to enhance ATM authorization policies.

FIG. 16 shows a prior art asynchronous replication engine.

FIG. 17 shows a prior art method for synchronous replication.

FIG. 18 shows a prior art coordinated commits replication engine.

FIG. 19 shows a prior art use of a Queue Manager with a coordinated commits replication engine wherein the Queue Manager is the voting participant.

FIG. 20 shows a prior art use of a Queue Manager with a coordinated commits replication engine wherein the Consumer is the voting participant.

FIG. 21 shows the Transaction Processing phase of an Event/Tx Tracking module that has joined a transaction to monitor it in accordance with a preferred embodiment of the present invention.

FIG. 22 shows the Transaction Commit phase of an Event/Tx Tracking module that has joined a transaction to monitor it in accordance with a preferred embodiment of the present invention.

FIG. 23 shows the Transaction Processing phase of an Event/Tx Tracking module that has joined a transaction to control it in accordance with a preferred embodiment of the present invention.

FIG. 24 shows the Transaction Commit phase of an Event/Tx Tracking module that has joined a transaction to control it in accordance with a preferred embodiment of the present invention.

FIG. 25 shows an example of the use of Event/Tx Tracking using transaction joining to monitor transaction security policies in accordance with a preferred embodiment of the present invention.

FIG. 26 shows an example of the use of Event/Tx Tracking using transaction joining to enforce transaction security policies in accordance with a preferred embodiment of the present invention.

FIG. 27 shows the use of an Event/Tx Tracking module in a synchronous data replication engine during database changes in accordance with a preferred embodiment of the present invention.

FIG. 28 shows the use of an Event/Tx Tracking module in a synchronous data replication engine during commit in accordance with a preferred embodiment of the present invention.

FIG. 29 shows the use of an Event/Tx Tracking module in a Coordinated Commits data replication engine during joining in accordance with a preferred embodiment of the present invention.

FIG. 30 shows the use of an Event/Tx Tracking module in a Coordinated Commits data replication engine during database changes in accordance with a preferred embodiment of the present invention.

FIG. 31 shows the use of an Event/Tx Tracking module in a Coordinated Commits data replication engine during commit in accordance with a preferred embodiment of the present invention.

DETAILED DESCRIPTION OF THE INVENTION

Certain terminology is used herein for convenience only and is not to be taken as a limitation on the present invention.

It is a purpose of the present invention to provide methods that allow a process to invoke additional processing functionality and to gather, log, and/or append qualifying information to audited transactions, including those that the process initiates and those that are initiated by system facilities. New processing functionality that may make use of the appended qualifying information includes enhanced security, assurance that regulatory requirements are being met, implementation of new business policies or applications, and many other enhancements to existing applications. The additional information that is needed for the enhanced processing functionality is not necessarily included in the event or transaction being processed, but it is available from other resources in the system.

It is a further purpose of the present invention to integrate this method into existing audited transaction processing systems with no coding changes to the applications. The goal is to create a safer, more efficient, and more reliable way than the use of prior art intercept library or intermediate process approaches.

For example, information that can be used to add processing functionality to a transaction might be obtained as follows. The originator of an event is often identified by the channel over which the event is received. The changes made by the event are available from the Transaction Manager's change log. The location of a mobile device can be determined by its GPS coordinates. The timing of the event is known from the system clock. The type of device used to generate the event may be contained in a table that correlates user IDs with device types. The reason for the transaction may be deduced from a rules engine. Most or all of this information is not included with the original transaction, but it is often available from other resources within the system, often only during the time that the transaction is active (e.g., before commit or abort).

By adding certain elements of information such as the above to an audited transaction, significant additional processing functionality can be added to the processing of the transaction. For instance, the restrictions on data access to users on mobile devices might be tighter than if they were using secure corporate terminals. The priority of processing events might be determined by the degree of urgency of the event. Transactions that violate certain rules may be rejected, or they may be modified to comply with the rules. Additional functions such as fraud monitoring may be invoked if a transaction appears to be suspicious.

2.1 Integrating the Event/Tx Tracking Module into Existing Applications

Various prior art means exist for integrating the Event/Tx Tracking module into the event or transaction processing flow without requiring modifications to the application processes themselves. These methods include using intercept libraries and using intermediate processes. The use of intercept libraries and intermediate processes has been described in the prior art Section 1.15, "Controlling Processing via an Intercept Library," and the prior art Section 1.16, "Controlling Processing via an Intermediate Process." These methods typically do not allow an Event/Tx Tracking module to be integrated with an audited transaction begun by a system facility rather than by an application.

A novel method for integrating an Event/Tx Tracking module into an audited transaction is to allow it to join the transaction as a monitoring participant or as a voting participant. In addition, the use of implicit joining allows an Event/Tx Tracking module to be integrated into any audited transaction, whether it be initiated by an application or by the system.

2.1.1 Joining an Audited Transaction

The processing of an audited transaction can be monitored, logged, controlled and/or enhanced by having an Event/Tx Tracking module join the transaction and become a voting member of the transaction. By doing so, the module has access to all of the transaction activity and can add significant processing functionality to the processing of the transaction, for example, by rejecting transactions that do not comply with a rules set or by modifying transactions to fit within a rules set. Transaction joining is applicable for use with any Transaction Manager that manages audited transactions. Examples include Transaction Managers that use the 1PC, 2PC, 3PC, or BASE transaction protocols, described in Section 1.11, "Transaction Management Protocols."

There are two ways in which an Event/Tx Tracking module can join a transaction—explicit joining and implicit joining. These prior art methods have been described in Section 1.9.1, "Explicit Joining," and Section 1.9.2, "Implicit Joining." Though joining a transaction is prior art, the use of an Event/Tx tracking module to join a transaction as a voting resource is novel.

A benefit of transaction joining is that the Event/Tx Tracking functions that it provides do not add to the path length of the transaction. The Event/Tx Tracking processing typically is accomplished in parallel with the normal processing of the transaction.

The Event/Tx Tracking module can join a transaction as "read-only" if all it wants to do is monitor and log information related to the transaction.

Implicit joining has the advantage of being able to join all transactions, whether they were initiated by an application or by the system. It has a further advantage over all other techniques in that it does not require a complex configuration process to implement. It must only ask the Transaction Manager to include it as a voting partner or as a monitoring partner in all transactions or in a defined subset of transactions. It eliminates the risks of misconfigurations that affect intercept libraries, intermediate processes, and explicit joins.

2.1.2 Monitoring and Logging an Audited Transaction with an Event/Tx Tracking Module The monitoring and logging of an audited transaction by an Event/Tx Tracking module is shown in FIG. 21. The Event/Tx Tracking module identifies a transaction that has begun or is in progress (an incomplete transaction) that is being executed on behalf of an application or system utility. The identification of uncompleted transactions may be the task of the Event/Tx Tracking module, or it may be the responsibility of a Selection Engine that spawns Event/Tx Tracking modules that can join each new transaction.

The Event/Tx Tracking module joins the transaction either explicitly or implicitly as described in Section 1.9.1, "Explicit Joining," and Section 1.9.2, "Implicit Joining." The Event/Tx Tracking module identifies non-durable attributes of the uncompleted transaction and makes them durable by logging them directly to persistent storage or by making use of a logging engine to do so. A non-durable attribute may have transient values, in which case the logging function makes durable at least one of the transient values.

The selected attributes are not otherwise needed in order to complete the transaction. For instance, attributes that are needed for a transaction may include one or more account numbers, an amount, a function (e.g., transfer funds from one account to another), and the changes to be made to the database. Examples of non-durable attributes that may be logged for extended transaction processing functionality may include the user ID of the user that started the transaction, a program identifier of a program that participated in the transaction, and/or the time of day of the transaction. Some transaction processing systems treat these examples of non-durable attributes as being durable attributes. In this case, these durable attributes are by definition not non-durable attributes.

The collecting and logging of the non-durable attributes requires no application or system utility modifications. These functions are all performed by the Event/Tx Tracking module.

The Event/Tx Tracking module can be a resource manager. It can interface directly with the Transaction Manager and act as a voting resource by joining the transaction. Having joined the transaction either explicitly or implicitly, the Event/Tx Tracking module has access to the progress of the transaction and can participate in the processing functions applied to the transaction. In FIG. 21, as the application (1) makes changes (2) to it database (3), the Event/Tx Tracking module (4) can track the activity associated with the transaction (5). It can compare that activity against a set of rules in its Rules Engine (6) and can annotate the transaction events as it records them (7) in its event/transaction log (8).

In FIG. 22, when the application (1) issues a commit request (2) to its Transaction Manager (3), the Transaction Manager asks each of the resources involved in the transaction if it is ready to commit. This includes not only the database (4*a*) but also the Event/Tx Tracking module (4*b*, 5), since this module has joined the transaction and is therefore a voting participant. Using its Rules Engine (6) through its extended processing functionality, the Event/Tx Tracking module can decide whether to approve the transaction or to reject it. If it approves the transaction, it issues a "yes" vote (7*a*) to the Transaction Manager. If the database resource and all other participants in the transaction also vote "yes," the Transaction Manager commits the transaction and notifies the application that the transaction has been committed (8). If the Event/Tx Tracking module, the database, or any other participant in the transaction votes "no," the transaction is aborted by the Transaction Manager; and the application is so informed.

2.1.3 Controlling an Audited Transaction Modified with an Event/Tx Tracking Module In addition to logging the activities of an audited transaction, an Event/Tx Tracking module can be used to modify the actions of a transaction and to otherwise control it via its additional processing functionality and optional appended data that it can apply to the transaction.

To control an audited transaction, the Event/Tx Tracking module identifies a transaction that has begun or is in progress (an incomplete transaction) that is being executed on behalf of an application or system utility. The identification of uncompleted transactions may be the task of the Event/Tx Tracking module, or it may be the responsibility of a Selection Engine that spawns Event/Tx Tracking modules that can join each new transaction.

The Event/Tx Tracking module joins the transaction either explicitly or implicitly as described in Section 1.9.1, "Explicit Joining," and Section 1.9.2, "Implicit Joining." The Event/Tx Tracking module identifies non-durable attributes of the uncompleted transaction and makes them durable by logging them directly to persistent storage or by making use of a logging engine to do so.

The selected attributes are not otherwise needed in order to complete the transaction. For instance, attributes that are needed for a transaction may include one or more account numbers, an amount, a function (e.g., transfer funds from one account to another), and the changes to be made to the database. Examples of non-durable attributes that may be logged for extended transaction processing functionality may include the user ID of the user that started the transaction, a program identifier of a program that participated in the transaction, and/or the time of day of the transaction.

The collecting and logging of the non-durable attributes requires no application or system utility modifications. These functions are all performed by the Event/Tx Tracking module.

The Event/Tx Tracking module can be a resource manager. It can interface directly with the Transaction Manager and act as a voting resource by joining the transaction. Having joined the transaction either explicitly or implicitly, the Event/Tx Tracking module has access to the progress of the transaction and can participate in the processing functions applied to the transaction. Once the Event/Tx Tracking module has joined a transaction, the application process performs the processing functions required of the transaction, as generally described in Section 1.10.1, "Transaction Processing," and more specifically as shown in FIG. 23. The application process (1) makes certain changes (2) to one or more application databases (3). During this process, the Event/Tx Tracking module (4) gathers information about the generated event (5) from the Transaction Manager, from the application environment, or via other system calls. It also monitors the transaction activity (reads, inserts, updates, deletes) (6) and may record this information (7) in an event/transaction log (8).

As the transaction progresses, based on the set of rules provided to it via its Rules Engine (9), the Event/Tx Tracking module can use its additional processing functionality and the optional attributes that the Event/Tx Tracking module has associated with the transaction to decide to make certain changes to the transaction. It can perform its own reads of the database and can add its own updates, inserts, and deletes to the database (10). It also can change any of the events and reapply the changes.

When the transaction is completed, the application process will attempt to commit the transaction, as generally described in Section 1.10.2, "Transaction Commit," and more specifically as shown in FIG. 24. Since the Event/Tx Tracking module is a voting participant in the transaction, it can vote to commit the transaction. It also can vote to abort the transaction. The application process (1) will issue a commit request (2) to the Transaction Manager (3). The Transaction Manager will ask if all of the resources participating in the transaction are ready to commit the transaction (4*a*, 4*b*). These resources include the databases that were changed by the transaction as well as the Event/Tx Tracking module (5), which earlier had joined the transaction as a voting participant.

The Event/Tx Tracking module may in some cases obtain final event information (6*a*) from the application process, from the Transaction Manager, through other system calls, and any additional transaction information (6*b*) from the databases that were changed. Based on the set of rules provided to it via its Rules Engine (7), the Event/Tx Tracking module can use its additional processing functionality and the attributes that have been associated with the transaction to decide to make certain changes to the transaction or to reject the transaction. It then will issue a "yes" vote to the Transaction Manager (8*a*) if it approves of the transaction or a "no" vote if it has decided to abort the transaction. If all resources vote "yes" (8*b*), the Transaction Manager can complete the commit of the transaction. If any resource votes "no," the transaction is aborted.

The actions that the Event/Tx Tracking module can take on the transaction can be extended in other, unlimited ways. For instance, it the transaction is being replicated to a target system and one or more rules in the Event/Tx Tracking module's Rules Engine are being met, the transaction can proceed using synchronous replication. If one or more rules in its Rules Engine are not being met, the transaction can proceed using asynchronous replication. Alternatively, if one or more rules are being met, the data is replicated using encryption. If one or more rules are not being met, the data is replicated unencrypted.

If the Event/Tx Tracking module is maintaining an event/transaction log, it will write the remaining event and transaction information (9) to that log (10). This information is then available for use by downstream processes to access and take action.

2.1.4 Example Rules for the Event/TX Tracking Module

As mentioned previously, the rules that the Event/TX Tracking module can implement and the actions that the Event/Tx Tracking module can take on the transaction are quite extensive. They can be statically defined before system startup, or dynamically loaded and re-loaded as they need to change without requiring an outage of the application.

The following table is meant to highlight some of these rules and actions that the Event/TX Tracking module can implement. In the following table, Attribute is meant to list the item or information that is being checked or tested, Rule is meant to describe the rule that is being applied to the attribute(s), and Action is meant to describe the action to take when the rule is satisfied or violated (depending on how the rule is written).

| Attribute | Rule | Action |
| --- | --- | --- |
| Changes to the database (e.g., transaction 'amount') | If the amount is over a preset threshold or limit | Disallow the transaction from going forward (e.g., abort the transaction) |
| Changes to the database (e.g., transaction 'amount') | If the amount is over a preset threshold or limit | Alter the transaction amount to be at the threshold and allow the transaction to go forward |
| Changes to the database (e.g., transaction 'amount') | If the amount is over a preset threshold or limit | Weight the average transaction amount and if near the threshold, increase the threshold by 25%; if the transaction amount falls within the new limit, allow the transaction to go forward, else disallow the transaction from going forward |
| Changes to the database (e.g., transaction 'amount') and time of day of the request | If the amount is over a preset threshold or limit and the time of the request is from 12:00 am (midnight) to 4:00 am | Automatically disallow the transaction from going forward (e.g. abort the transaction) |
| Changes to the database (e.g., transaction 'amount') and time of day of the request | If the amount is over a preset threshold or limit and the time of the request is from 12:00 am (midnight) to 4:00 am | Automatically alter the transaction amount to be at the threshold and allow the transaction to go forward |
| Changes to the database (e.g., transaction 'amount') | If the amount is over a preset threshold or limit | Manually request the user to finger swipe to validate who they are and allow (successful swipe) or disallow (unsuccessful swipe) the transaction from going forward |
| User ID (user requesting transaction) | If the user id is in a list of allowed user id's | Allow the transaction to go forward |
| User ID (user requesting transaction) | If the user id does not fall into a preset list of user id's | Manually send a text code to a mobile phone and request the user to enter the text code for authorization and allow (successful code entered) or disallow (unsuccessful code entered) the transaction to go forward |
| User ID (user requesting transaction) | If the user id does not fall into a preset list of user id's | Score the user's total account activity, and if over a threshold, automatically add them to the preset list and allow the transaction to go forward |
| Program Name or ID (program executing transaction) | If the program id does not fall into a list of program id's | (unknown program executing transaction) Disallow the transaction from going forward |
| Program Name or ID (program executing transaction) and time of day | If the program id does not fall into a list of program id's that are allowed to run between 4:00 am and 6:00 am | (program is not running at an allowed time) Disallow the transaction from going forward |
| Changes to the database (e.g., transaction 'amount') | If the amount is over a preset threshold or limit | If in a data replication environment, replicate the transaction to the target environment synchronously, else replicate it asynchronously |

-continued

| Attribute | Rule | Action |
|---|---|---|
| Changes to the database (e.g., list of files or tables that had changes made as part of the transaction) | If the table or file is in a list | If in a data replication environment, replicate the changes for the tables in the list to the target environment synchronously, else replicate the changes for the tables not in the list to the target environment asynchronously |
| Changes to the database (e.g., sensitive user information such as health information or personal financial information) | If the changes update information that is considered sensitive user information | Encrypt the sensitive transaction information, else do not encrypt the transaction information |
| Changes to the database (e.g., sensitive user information such as health information or personal identification information) | If the changes update information that is considered sensitive user information | If in a data replication environment, replicate the transaction to the target environment using encryption, else replicate it without using encryption |

The examples of attributes, rules and actions in the table above are not meant to limit the scope of the invention. Accordingly, other types of attributes, rules and actions may be suitable for use with the present invention.

2.2 the Distinction Between Event/Tx Tracking and the HPE DP2 Disk Process

DP2 is the disk process in the HPE NonStop operating system available from HPE, Inc., Palo Alto, Calif., USA. A DP2 process is a resource manager that manages writes to a disk in the disk storage system of HP NonStop servers on behalf of the file system and TMF, the NonStop Transaction Management Facility that serves as the NonStop Transaction Manager. Each disk in a NonStop server is managed by its own DP2 process. TMF implicitly joins a DP2 process to any transaction that updates the DP2's disk. That DP2 process is then a voting participant in the transaction and can vote to commit or abort the transaction.

Likewise, an Event/Tx Tracking module can be a resource manager. It can interface directly with the file system and/or a Transaction Manager and act as a voting resource by joining the transaction. Having joined the transaction either explicitly or implicitly, the Event/Tx Tracking module has access to the progress of the transaction, can participate in the processing functions applied to the transaction, and can vote to commit or abort the transaction.

However, there are major differences between a DP2 process and an Event/Tx Tracking module. A DP2 process can vote to abort a transaction only if it is unable to write the transaction's changes to its disk. On the other hand, an Event/Tx Tracking module can use all of the data in the transaction plus optionally added data to verify the transaction against a Rules Set managed by a Rules Engine. If one or more rules are not met, the Event/Tx Tracking module can modify the transaction to meet the rules and then vote to commit the transaction. Alternatively, it can vote to abort the transaction. Thus, it provides a great deal more flexibility and functionality in the handling of a transaction as a resource manager than does a DP2 process.

2.3 an Example of how Event/Tx Tracking Monitors a Transaction—Logging Transaction Security Events An example of Event/Tx Tracking using audited transaction joining to monitor a transaction is shown in FIG. 25. Here, Event/Tx Tracking uses its additional processing functionality to monitor the activity of an audited transaction to determine if the transaction satisfies the organization's security policies. The events of the transaction are logged in a Security Audit Log for use by other applications to search for security violations.

In order to be a party to the transaction, the Event/Tx Tracking module (1) has joined the transaction (2), either explicitly as described in Section 1.9.1, "Explicit Joining," or implicitly as described in Section 1.9.2, "Implicit Joining." As the application (3) makes the transaction's changes (4) to its database (5), the Event/Tx Tracking module monitors these changes (6) for potential security violations using its additional processing functionality. It monitors the transaction flow against rules (7) in its Security Policy Rules Engine (8). The module records the transaction's changes (9), perhaps annotated according to its Security Policy Rules Engine, in its Security Audit Log (10).

When the application requests the Transaction Manager (11) to commit the transaction (12), the Transaction Manager will ask each of the resources involved in the transaction whether or not it is prepared to commit (13a, 13b). This includes the application database (5) and the Event/Tx Tracking module (1).

If the transaction complies with the security policy as implemented in the Security Policy Rules Engine (8), the Event/Tx Tracking Module will respond to the Transaction Manager with a "yes" reply (14a), allowing the Transaction Manager to commit the transaction (15) if all other resources voted "yes" (14b). If the transaction violates the security policy, the Event/Tx Tracking module can respond with a "no" reply, thus forcing the Transaction Manager to abort the transaction.

2.4 an Example of how Event/Tx Tracking Controls a Transaction—Enforcing Transaction Security Polices An example of Event/Tx Tracking using audited transaction joining to monitor and control a transaction via the Event/Tx Tracking module's additional processing functionality is shown in FIG. 26. In this example, Event/Tx Tracking monitors the activity of an audited transaction to determine if it satisfies the organization's security policies. If it does not, the Event/Tx Tracking module can modify the transaction to make it compliant; or it can cause the transaction to be aborted.

In order to be a party to the transaction, the Event/Tx Tracking module (1) has joined the transaction (2), either explicitly as described in Section 1.9.1, "Explicit Joining," or implicitly as described in Section 1.9.2, "Implicit Joining.

As the application (3) makes the transaction's changes (4) to its database (5), the Event/Tx Tracking module monitors these changes (6) for potential security violations. It monitors the transaction flow against rules (7) in its Security Policy Rules Engine (8). If necessary, it can modify the changes made by the transaction (9) via its additional processing functionality so that the transaction complies with the security policies. It can also record the changes (10) in its Security Audit Log (11).

When the application requests the Transaction Manager (12) to commit the transaction (13), the Transaction Manager will ask each of the resources involved in the transaction whether or not it is prepared to commit (14a, 14b). This includes the application database (5) and the Event/Tx Tracking module (1).

The Event/Tx Tracking module may review (15) the database activity made by the transaction as recorded in the process' Security Audit Log (11) via its additional processing functionality. If the transaction complies with the security policy as implemented in the Security Policy Rules Engine (8), the Event/Tx Tracking Module will respond to the Transaction Manager with a "yes" reply (16a). This allows the Transaction Manager to commit the transaction (17) if all other resources voted "yes" (16b). If the transaction violates the security policy, the Event/Tx Tracking module may modify the transaction's changes (9) to bring it into compliance and vote to commit the transaction. Alternatively, it can respond with a "no" reply, thus forcing the Transaction Manager to abort the transaction.

2.5 Event/Tx Tracking in Data Replication Configurations

Event/Tx Tracking can be applied at both the source and target systems in data replication applications.

2.5.1 Synchronous Data Replication

A use of Event/Tx Tracking for synchronous replication appears in FIG. 27 and FIG. 28. The synchronous replication of data is described in Section 1.18.2, "Synchronous Replication," and in FIG. 17. FIG. 27 and FIG. 28 represent a modified version of FIG. 17. FIG. 27 shows the procedures to replicate database changes via synchronous replication under the control of Event/Tx Tracking modules. FIG. 28 shows the procedures to commit the transaction when Event/Tx Tracking modules exist as voting resources.

2.5.1.1 Joining

Referring to FIG. 27, Event/Tx Tracking module A (1) with its Rules Engine (2) has joined (3) the transaction in Computer A (4) either explicitly or implicitly. Event/Tx Tracking module B (5) with its Rules Engine (6) has joined (7) the transaction in Computer B (8) either explicitly or implicitly.

2.5.1.2 Database Changes

Database changes made by the application are applied to the source database (9) by Transaction Manager A (10). Event/Tx Tracking module A monitors the database changes (11) being made by the application via its additional processing functionality. If it decides to modify these changes, it sends the modifications (12) to Transaction Manager A, which will apply them to the source database.

Alternatively, the Event/Tx Tracking module could decide to only modify the changes that are sent to the target database and not modify the changes that were applied to the source database. This is useful, for example, to cull out certain source data from being sent to the target if the target database is meant to contain only data for or made by certain users and not all users.

Transaction Manager A, as part of synchronous replication, will send the modified database changes to Computer B. These changes are intercepted by Event/Tx Tracking module B and, using its extended processing functionality, are modified if necessary according to its rules engine. These modifications then are sent to Transaction Manager B (13), which will write them to the target database (14).

2.5.1.3 Committing

The commit process is shown in FIG. 28. Both Event/Tx Tracking modules are voting resources in the transaction. Both must vote yes for the transaction to be committed. If either votes no, the transaction is aborted.

When the application issues a commit request (1) to Transaction Manager A (2), Transaction Manager A will ask Transaction Manager B (3) in the target system (4) if it is ready to commit (5). It also asks the Event/Tx Tracking module A (6) in its source system (7) if it is ready to commit (8), since this Event/Tx Tracking module has joined its transaction. Likewise, Transaction Manager B will ask Event/Tx Tracking module B (9) in the target system if it is ready to commit (10), since this module has joined its transaction. If Event/Tx Tracking module B votes "yes" (11), and if Transaction Manager B has been successful in safe-storing or applying all of its database changes, it will respond to Transaction Manager A with a "yes" vote (12).

If Transaction Manager A has been successful in safe-storing or applying all of its database changes, and if Transaction Manager B and the Event/Tx Tracking module A all have voted "yes" (13), then Transaction Manager A will tell Transaction Manager B to commit the transaction (14). Both Transaction Managers will commit the changes to their respective databases (15, 16), and the application is informed that its transaction has been committed. If any resource votes "no," the transaction will be aborted.

Thus, by using Event/Tx Tracking with its additional processing functionality, the contents of the source database can be controlled according to a rules set. In addition, the contents of the target database can be modified further. The contents of the target database can be different from that of the source database, as defined by the rules set.

2.5.2 Coordinated Commits Data Replication

An example of the use of Event/Tx Tracking in a Coordinated Commits data replication engine is shown in FIG. 29, FIG. 30, and FIG. 31.

2.5.2.1 Joining

FIG. 29 shows the initial joining of the Event/Tx Tracking modules to the transaction. The Event/Tx Tracking module A (1) with its Rules Engine joins via explicit joining, and the Event/Tx Tracking module B (2) with its Rules Engine joins via implicit joining.

When the application issues a begin transaction request (3) to Transaction Manager A (4), the application will send the transaction ID (5a, 5b) received from Transaction Manager A to the Coordinated Commits Coordinator (6) and to Event/Tx Tracking module A (1). Each of these components will join the transaction by sending a request (7a, 7b) to Transaction Manager A.

Transaction Manager A will enter a begin-transaction token (8) into the change log. This token will be replicated (9) to the target system's Consumer (10), which will send it (11) to Transaction Manager B (12). Transaction Manager B will begin an independent transaction on the target system and will implicitly join (13) Event/Tx Tracking module B with its Rules Engine to the transaction. At this point, the Coordinated Commits Coordinator and both the source-side and target-side Event/Tx Tracking modules are joined to the transaction as voting resources.

2.5.2.2 Database Changes

FIG. 30 indicates the steps involved in updating the databases. As the application issues database changes (1) to Transaction Manager A (2), the Transaction Manager will apply these changes to the source database (3). The Event/Tx Manager A (4) monitors the changes (5) via its additional processing functionality as they are applied to the database. It may decide to modify some of the changes according to rules established in its Rules Engine and will send the change modifications (6) to Transaction Manager A to apply to the source database.

Transaction Manager A will enter the application changes and the subsequent changes made by the Event/Tx Tracking module A into the change log (7). These changes will be replicated (8) to the target system, where the Consumer (9) will send them (10) to the target-side Transaction Manager B (11). Transaction Manager B will apply these changes to the target database (12). Event/Tx Tracking module B monitors (13) the changes to the database via its additional processing functionality and may issue modified changes (14) to Transaction Manager B, which will apply them to the target database.

Thus, by using Event/Tx Tracking, the contents of the source database can be controlled according to a rules set. In addition, the contents of the target database can be modified further. The contents of the target database can be different from that of the source database, as defined by the rules set.

Note that the placement of the Event/Tx Tracking modules is different from that described earlier for Synchronous Replication in FIG. 27 and FIG. 28. In those examples, the Event/Tx Tracking modules were placed in line with the changes. In the case of Coordinated Commits, the modules are shown monitoring the database updates after they have been applied to the databases. This illustrates the flexibility that can be achieved by configuring Event/Tx Tracking to meet various requirements.

2.5.2.3 Committing

FIG. 31 shows the commit processing for Coordinated Commits with Event/Tx Tracking. When the application requests that its transaction be committed, Transaction Manager A (1) must ensure that all its voting resources are prepared to commit. This includes the Coordinated Commit replication engine Coordinator (2) and Event/Tx Tracking module A (3). Transaction Manager A asks the Event/Tx Tracking module A if it is ready to commit (4). If the module is ready, it responds with a "yes" vote (5).

Transaction Manager A also asks the Coordinator if it is ready to commit (6). The Coordinator must ensure that the target system is ready to commit, so it asks Transaction Manager B in the target system (7) if it is ready to commit (8). Before Transaction Manager B can respond, it must check with Event/Tx Tracking module B (9), which is a voting resource. It asks Event/Tx Tracking module B if it is ready to commit (10). If the module is ready, it responds with a "yes" vote (11). If Transaction Manager B has safe-stored or applied all of the transaction's database changes, it responds to the source-side Coordinator with a "yes" vote (12). At this point, the Coordinator can respond to Transaction Manager A with a "yes" vote (13).

If Transaction Manager A has safe-stored or applied its database changes and has received a "yes" vote from all of its voting resources, it commits the transaction. If any resource votes "no," or if Transaction Manager A has not been able to safe-store or apply its database changes, it will abort the transaction.

2.6 Embedded Tx/Tracking Modules

In the previous examples, the Event/Tx Tracking modules have been illustrated as free-standing modules. However, an Event/Tx Tracking module can be embedded into any of the processes shown. The Event/Tx Tracking module may have an embedded Rules Engine, or it may use an external Rules Engine. For instance, in a Coordinated Commit data replication engine, the Coordinator, the Collector, and/or the Consumer all could have Event/Tx Tracking modules embedded within them.

If a process has an embedded Event/Tx Tracking module, the Event/Tx Tracking module will join transactions on behalf of the process; and the process will then become a voting resource for those transactions. The decision to join a transaction can be made at any point by the process, depending upon logic built into a user exit.

It is important to note that the resources referenced in the descriptions of explicit joining and implicit joining in Section 1.9, "Joining a Transaction" are not Event/TX Tracking modules. Joining a transaction with an Event/Tx Tracking module is novel and is core to this invention. The resources in Section 1.9 are ones that are performing their own work and that must be part of the transaction. In the prior art, they are not resources that will monitor, log, or attempt to modify the transaction as is the case with an Event/Tx Tracking module.

SUMMARY

Significant value can be made to a transaction by monitoring or controlling it with extended processing functionality. Additional information often is available in a system to enhance and control the information contained in events and transactions. This additional information is useful in many ways, for instance, to modify or reject events or transactions, to be vigilant for security breaches, and to monitor trends.

In the current art, such information typically is known after the fact and is found in various archives. Therefore, it primarily has only historical value.

However, there are many cases where services can be enhanced significantly if ancillary processing functions and/or information is available in real time while the event or transaction is being processed. The cost and risk of modifying existing applications often precludes such use. It is difficult if not impossible to modify many old legacy programs because the original developers are gone or the application documentation is missing.

Within the prior art exist the means to address the challenge by creating methods for acquiring this information in real time and for modifying the processing of events using the information with no application modifications. These methods rely on one or more Event/Tx Tracking modules that can monitor events, that can access related useful information, that can add information to events, and that can log or modify the processing of events using this information. Thus, the information is available in real time to support enhanced services.

Modification of existing applications to support such enhancement is avoided by several prior art techniques. An Event/Tx Tracking module can be implemented as an intercept library to be incorporated into an application so that the module can intercept events and can enhance them. An Event/Tx Tracking module can be implemented as an intermediate process to perform the same function. However, intercept libraries and intermediate processes cannot typically inject themselves into the processing of audited transactions that have been initiated by system processes. Furthermore, they are subject to configuration errors; as they must be added sometimes to hundreds or thousands of application processes. They are also inefficient because they increase the processing length of the application.

A novel method to add value to an audited transaction is for the Event/Tx Tracking module to join the transaction. In this way, it can follow and control or modify all actions performed by the transaction via additional processing functionality. The Event/Tx Tracking module can optionally add information to the transaction or to the event generating the transaction to aid in the control of the functions performed by the transaction, including modifying it or aborting it. Processing takes place in parallel with the normal transaction processing so that Event/Tx Tracking processing does not add to the transaction processing path length. In addition, by using implicit joining, transactions initiated by system processes can be monitored and controlled. Implicit joining also avoids the configuration problems and risks of other techniques.

The use of joining a transaction by an Event/Tx Tracking module is extendable to data replication systems in which Event/Tx Tracking modules can be active on both the source and the target systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of applying transactions against a database on a transaction processing system either synchronously or asynchronously, the method comprising:
   (a) using a tracking engine to:
      (i) identify an uncompleted transaction to be joined, wherein the uncompleted transaction is a transaction that has begun but has been neither committed nor aborted,
      (ii) join the uncompleted transaction, and
      (iii) collect one or more non-durable attributes of the joined uncompleted transaction, wherein the one or more non-durable attributes are attributes that are not otherwise needed in order to complete a transaction;
   (b) comparing the collected one or more non-durable attributes of the joined uncompleted transaction against rules in a rules engine that are applicable to the transaction to determine whether an applicable rule in the rules engine is met; and
   (c) allowing the joined uncompleted transaction to go forward and be applied against the database of the transaction processing system using:
      (i) a synchronous replication engine when the applicable rule is met, and
      (ii) an asynchronous replication engine when the applicable rule is not met.

2. The method of claim 1 wherein the collected one or more non-durable attributes of the joined uncompleted transaction include changes to the database.

3. The method of claim 1 wherein the collected one or more non-durable attributes of the joined uncompleted transaction include a time of day of the transaction.

4. The method of claim 1 wherein the collected one or more non-durable attributes of the joined uncompleted transaction include a user ID that started the transaction.

5. The method of claim 1 wherein the collected one or more non-durable attributes of the joined uncompleted transaction include a program identifier that participated in the transaction.

6. The method of claim 1 wherein the tracking engine joins the uncompleted transaction explicitly.

7. The method of claim 1 wherein the tracking engine joins the uncompleted transaction implicitly.

8. A method of applying transactions against a database on a transaction processing system either using encryption or not using encryption, the method comprising:
   (a) using a tracking engine to:
      (i) identify an uncompleted transaction to be joined, wherein the uncompleted transaction is a transaction that has begun but has been neither committed nor aborted,
      (ii) join the uncompleted transaction, and
      (iii) collect one or more non-durable attributes of the joined uncompleted transaction, wherein the one or more non-durable attributes are attributes that are not otherwise needed in order to complete a transaction;
   (b) comparing the collected one or more non-durable attributes of the joined uncompleted transaction against rules in a rules engine that are applicable to the transaction to determine whether an applicable rule in the rules engine is met; and
   (c) allowing the joined uncompleted transaction to go forward and be applied against the database of the transaction processing system using a replication engine that (i) replicates using encryption when the applicable rule is met, and (ii) replicates unencrypted when the applicable rule is not met.

9. The method of claim 8 wherein the collected one or more non-durable attributes of the joined uncompleted transaction include changes to the database.

10. The method of claim 8 wherein the collected one or more non-durable attributes of the joined uncompleted transaction include a time of day of the transaction.

11. The method of claim 8 wherein the collected one or more non-durable attributes of the joined uncompleted transaction include a user ID that started the transaction.

12. The method of claim 8 wherein the collected one or more non-durable attributes of the joined uncompleted transaction include a program identifier that participated in the transaction.

13. The method of claim 8 wherein the tracking engine joins the uncompleted transaction explicitly.

14. The method of claim 8 wherein the tracking engine joins the uncompleted transaction implicitly.

* * * * *